(12) United States Patent
Yang

(10) Patent No.: US 11,654,548 B2
(45) Date of Patent: May 23, 2023

(54) SUBUNIT MODULE FOR CONSTRUCTING MODULAR ROBOT

(71) Applicant: Beijing KEYi Technology Co., Ltd., Beijing (CN)

(72) Inventor: Jianbo Yang, Beijing (CN)

(73) Assignee: BEIJING KEYI TECHNOLOGY CO., LTD., Beijing (CN)

( * ) Notice: Subject to any disclaimer, the term of this patent is extended or adjusted under 35 U.S.C. 154(b) by 367 days.

(21) Appl. No.: 16/905,881

(22) Filed: Jun. 18, 2020

(65) Prior Publication Data

US 2021/0039249 A1     Feb. 11, 2021

Related U.S. Application Data

(63) Continuation of application No. PCT/CN2018/121440, filed on Dec. 17, 2018.

(30) Foreign Application Priority Data

Dec. 19, 2017 (CN) .......................... 201711379016.8

(51) Int. Cl.
*B25J 9/08* (2006.01)
*B25J 9/00* (2006.01)
*B25J 19/00* (2006.01)

(52) U.S. Cl.
CPC .............. *B25J 9/08* (2013.01); *B25J 9/0009* (2013.01); *B25J 9/0084* (2013.01); *B25J 19/0029* (2013.01)

(58) Field of Classification Search
CPC ................................ B25J 9/08; B25J 19/0029
See application file for complete search history.

(56) References Cited

U.S. PATENT DOCUMENTS 6,084,373 A * 7/2000 Goldenberg ............... B25J 9/08
901/23
2003/0038607 A1   2/2003 Yim et al.
(Continued)

FOREIGN PATENT DOCUMENTS

CN     102672727 A    9/2012
CN     104454978 A    3/2015
(Continued)

*Primary Examiner* — Jake Cook
*Assistant Examiner* — Gregory T Prather
(74) *Attorney, Agent, or Firm* — Andrew C. Cheng

(57) ABSTRACT

The present invention relates to the field of intelligent robots, and more particularly to a subunit module for constructing a modular robot. The subunit module includes a first housing and a second housing which are disposed oppositely. The first housing and the second housing are rotatable relative to each other. Each of the two housings is provided with a docking part. The docking part is used to mechanically and electrically connect other robot modules adjacent to it. The subunit module further includes a control circuit. The control circuit is used for communicating with other robot modules. The subunit module receives control signals from other robot modules to control the relative rotation of the first and second housings of the subunit module; and/or the subunit module receives an external force so that the first and second housings rotate relative to each other.

15 Claims, 12 Drawing Sheets

(56) References Cited

U.S. PATENT DOCUMENTS

| | | | | |
|---|---|---|---|---|
| 2012/0286629 A1* | 11/2012 | Johnson | ............... | H02K 29/08 |
| | | | | 310/68 B |
| 2018/0111275 A1* | 4/2018 | Kurek | ............... | B25J 17/00 |
| 2019/0184581 A1* | 6/2019 | Xiong | ............... | B25J 9/1025 |
| 2019/0337159 A1* | 11/2019 | Tokuda | ............... | H02K 7/003 |

FOREIGN PATENT DOCUMENTS

| | | |
|---|---|---|
| CN | 105172932 A | 12/2015 |
| CN | 106272385 A | 1/2017 |
| CN | 108189028 A | 6/2018 |
| CN | 108274458 A | 7/2018 |
| CN | 207807735 U | 9/2018 |
| CN | 207983353 U | 10/2018 |
| CN | 207983355 U | 10/2018 |
| WO | 9901261 A1 | 1/1999 |

\* cited by examiner

SUBUNIT MODULE FOR CONSTRUCTING MODULAR ROBOT

TECHNICAL FIELD

The present invention relates to the field of intelligent robots, and more particularly, to a subunit module for constructing a modular robot.

BACKGROUND

With the development of science and technology, robots have been used in many industries. A modular robot is composed of modular units. With the advantages of shape plasticity and variable functions, the modular robot has become a research hotspot in recent years. However, the existing modular robot is complicated in structure, and difficult to manufacture.

Therefore, how to provide a modular robot with a simple structure has become a demand in the field of robots.

SUMMARY

In order to overcome the technical problem that the structure of the existing modular robot is complicated, the present invention provides a subunit module for constructing a modular robot.

The solution of the present invention to solve the technical problem is to provide a subunit module for constructing a modular robot. The subunit module includes a first housing and a second housing that are disposed oppositely, wherein the first housing and the second housing are rotatable relative to each other; each of the two housings is provided with a docking part; the docking part is used to mechanically and electrically connect other robot modules adjacent to it; the subunit module further includes a control circuit for communicating with other robot modules; the subunit module receives control signals from other robot modules to control the relative rotation of the first and second housings of the subunit module; and/or the subunit module receives an external force such that the first housing and the second housing rotate relative to each other.

Preferably, the subunit module further includes a motor, wherein the motor and the docking part are electrically connected to the control circuit, and the control circuit receives the control signal through the docking part or the control circuit receives a wireless control signal to control the motor to drive the first housing and the second housing to rotate relative to each other.

Preferably, the subunit module further includes a multi-stage bearing assembly, wherein the first and second housings are both connected to the multi-stage bearing assembly, and the first housing and the second housing are rotatably connected to each other through the multi-stage bearing assembly.

Preferably, the multi-stage bearing assembly includes a multi-stage bearing assembly inner ring, a multi-stage bearing assembly outer ring, and a middle ring assembly, wherein the middle ring assembly is rotatable relative to the multi-stage bearing assembly inner ring and the multi-stage bearing assembly outer ring; the middle ring assembly is connected to a drive assembly; the first housing is connected to the multi-stage bearing assembly outer ring; the second housing is connected to the middle ring assembly; and the drive assembly drives the middle ring assembly to drive the second housing to rotate.

Preferably, the subunit module further includes a mounting bracket, wherein the mounting bracket is disposed on a side of the multi-stage bearing assembly away from the second housing, the mounting bracket is connected to the multi-stage bearing assembly, and the mounting bracket is connected to the first housing through the docking part and the multi-stage bearing assembly.

Preferably, the subunit module further includes a rotating conductive assembly, wherein the rotating conductive assembly includes a fixed end and a rotating end which are disposed oppositely; the rotating end is rotatable relative to the fixed end; the rotating conductive assembly is disposed on a side of the multi-stage bearing assembly away from the first housing: the fixed end is connected to the first housing through the multi-stage bearing assembly; and the rotating end is connected to the second housing.

Preferably, the rotating end is connected to the docking part, and the docking part is connected to the second housing through the multi-stage bearing assembly.

Preferably, the subunit module further includes an angle measuring device, wherein the angle measuring device is disposed on the side of the multi-stage bearing assembly away from the first housing, one end of the angle measuring device is connected to the first housing through the multi-stage bearing assembly, and the other end of the angle measuring device passes through the rotating conductive device and is connected to the rotating end of the rotating conductive device.

Preferably, a plane where a rotation axis is located when the first housing and the second housing rotate is a rotating plane, and the docking parts are inclined with respect to the rotating plane.

Preferably, the subunit module further includes a prompting member and a power supply, wherein the prompting member is disposed on the first housing and/or on the second housing, and the power supply is connected to the first housing.

Compared with the prior art, the subunit module according to the present invention includes the first housing and the second housing which are disposed oppositely. The first housing and the second housing are rotatable relative to each other. Each of the two housings is provided with the docking part. The docking part is used to mechanically and electrically connect other robot modules adjacent to it. The subunit module further includes the control circuit. The control circuit is used for communicating with other robot modules. The subunit module receives control signals from other robot modules to control the relative rotation of the first and second housings of the subunit module; and/or the subunit module receives an external force so that the first and second housings rotate relative to each other. The structure of the subunit module is simple. The two housings are rotatable relative to each other to control the position of other unit modules. The position adjustment structure is simple and feasible.

The subunit module according to the present invention further includes the multi-stage bearing assembly. The first housing and the second housing are both connected to the multi-stage bearing assembly. The first housing and the second housing are rotationally connected to each other through the multi-stage bearing assembly, resulting in a low friction. The first housing and the second housing are rotationally connected together.

The multi-stage bearing assembly according to the present invention includes the multi-stage bearing assembly inner ring, the multi-stage bearing assembly outer ring and the middle ring assembly. The middle ring assembly is rotatable relative to the multi-stage bearing assembly inner ring and the multi-stage bearing assembly outer ring. The middle ring assembly is connected to the drive assembly. The first housing is connected to the multi-stage bearing assembly outer ring. The second housing is connected to the middle ring assembly. The drive assembly drives the middle ring assembly to drive the second housing to rotate. The multi-stage bearing assembly has a simple structure and low friction, which prolongs the service life of the subunit module and reduces the power of the motor.

The subunit module according to the present invention further includes the rotating conductive assembly. The rotating conductive assembly includes the fixed end and the rotating end that are disposed oppositely. The rotating end is rotatable relative to the fixed end. The rotating conductive assembly is disposed on the side of the multi-stage bearing assembly away from the first housing. The fixed end is connected to the first housing through the multi-stage bearing assembly. The rotating end is connected to the second housing. When the first housing and the second housing rotate relative to each other, wires therein will not be broken during rotation.

The plane where the rotation axis is located when the first housing and the second housing according to the present invention rotate is a rotating surface, and the docking parts are inclined with respect to the rotating surface, so that when the subunit module rotates, the unit module connected thereto will move in two directions.

DETAILED DESCRIPTION

In order to make the objects, technical solutions and advantages of the present invention clearer, the present invention will be described in further detail with reference to the accompanying drawings and embodiments. It should be understood that the specific embodiments described herein are only used to explain the present invention, rather than limiting the present invention.

Figure 1:
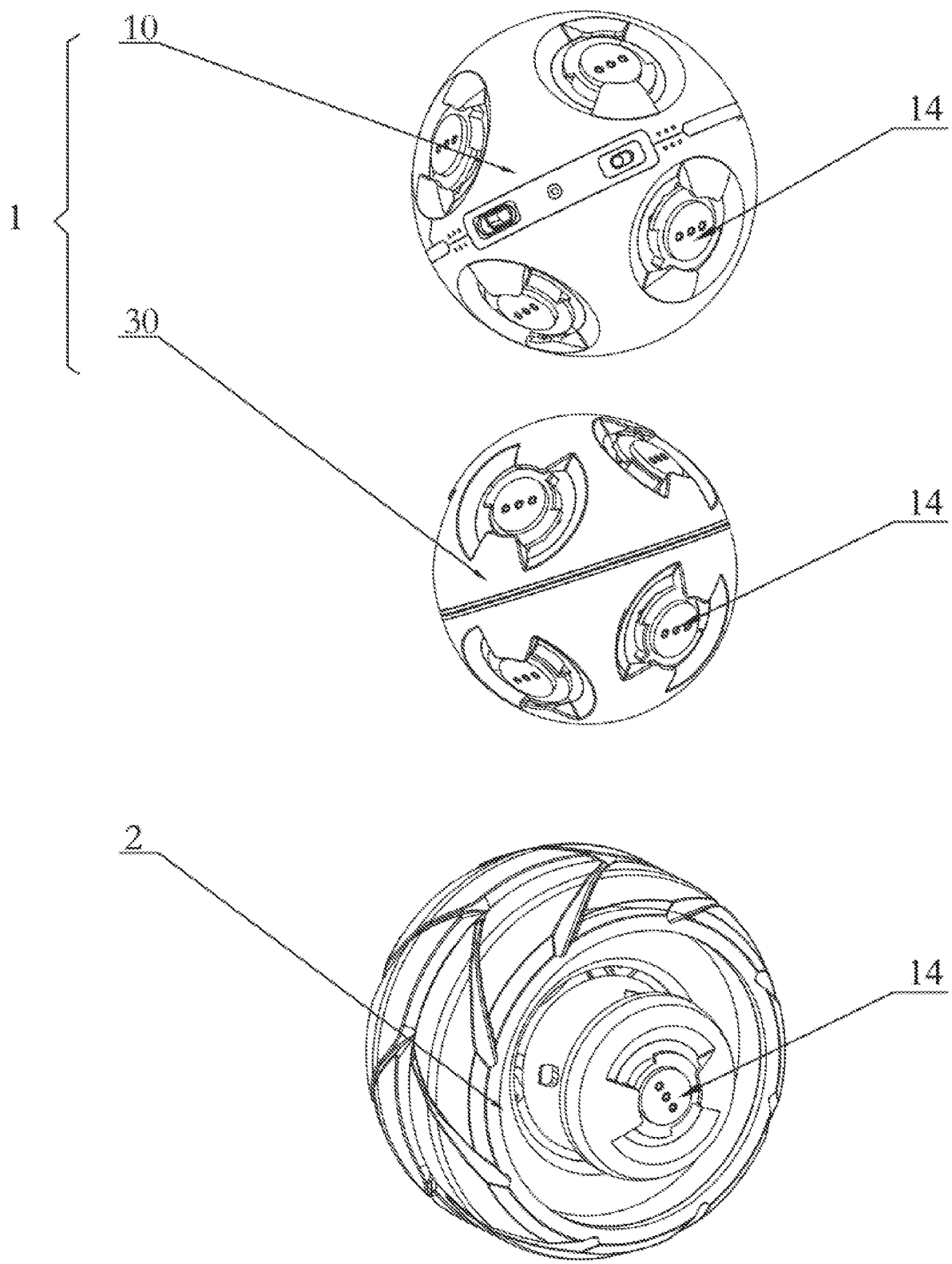
FIG. 1 is a spatial structural diagram of modular robot's modules of the present invention.

Referring to FIG. 1, the present invention provides a modular robot (unlabeled). The modular robot is composed of standard independent modules. Each module has a drive part, a power source, etc. Different robot modules are combined together to be controlled by a control system and constitute the modular robot according to the present invention. A modular robot can be combined by the same robot modules or by a plurality of different robot modules. In an embodiment of the present invention, a modular robot includes two types of robot modules, namely: a unit module 1 for constructing the modular robot (hereinafter referred to as a unit module) and a wheel 2. Each of the unit module 1 and the wheel 2 includes a docking part 14. The unit module 1 and the wheel 2 are detachably connected to each other by the docking parts 14. After the connection, mechanical connection, electrical conduction and signal transmission can be realized between the docking parts 14. Preferably, the unit module 1 may send a control signal to control the wheel 2 to rotate. It can be understood that the modular robot may also include other modules. The present invention is not limited to use only two types of modules. As long as the technical solutions protected by the present invention are applied, they fall within the protection scope of the present invention. It can be understood that the present invention may further include a control terminal. The control terminal is wirelessly connected to the unit module 1 and/or the wheel 2 to control the unit module 1 and/or the wheel 2. The control terminal may send signals to the modules of the modular robot. The control terminal, the unit module 1 and the wheel 2 form a modular robot control system. It can be understood that the control terminal may also be used as a part of the robot module.

The wheel 2 is provided with a motor therein. The motor is electrically connected to the docking part 14 of the wheel 2. The structure of the docking part 14 of the wheel 2 is the same as that of the docking part 14 of the unit module 1. The structure of the docking parts 14 will be described in detail later, and will not be described here.

The unit module 1 includes a main unit module 30 for constructing the modular robot (hereinafter referred to as a main unit module) and a subunit module 10 for constructing the modular robot (hereinafter referred to as a subunit module). The main unit module 30 and the subunit module 10 each also includes one or more docking parts 14. When the docking parts 14 of the main unit module 30 and the subunit module 10 are detachably connected to each other, electrical conduction can be realized between the two corresponding docking parts 14. The main unit module 30, the subunit module 10 and the wheel 2 may be mutually detachably connected to one another. By using a plurality of wheels 2, the subunit module 10 and the main unit module 30 may construct modular robots in different combinations and with different functions. The control terminal may send a signal to the subunit module 10. When the control terminal sends a signal to the subunit module, the control terminal sends the signal to the main unit module 30 first, and then the main unit module 30 sends the signal to the subunit module 10: or the control terminal directly sends the signal to the subunit module 10.

The main unit module 30 includes a main communication module (not shown), a power supply (not shown), and a docking part 14. The power supply is electrically connected to the docking part 14 and the main communication module. The main unit module 30 is connected to the subunit module 10 and/or the wheel 2 through the docking part 14. The main unit module 30 further includes a charging port and an indicator lamp. The charging port and the indicator lamp are both electrically connected to the power supply. The charging port is used to charge the power supply. The indicator lamp is used to indicate different conditions. For example, when the power supply is being charged, the indicator lamp is green; when the power supply is almost empty, the indicator lamp is red: when the main unit module 30 is connected to a network, the indicator lamp flashes, etc. It can be understood that there can be one indicator lamp or a plurality of indicator lamps. In the present invention, "a plurality of" means "at least two".

Figure 2:
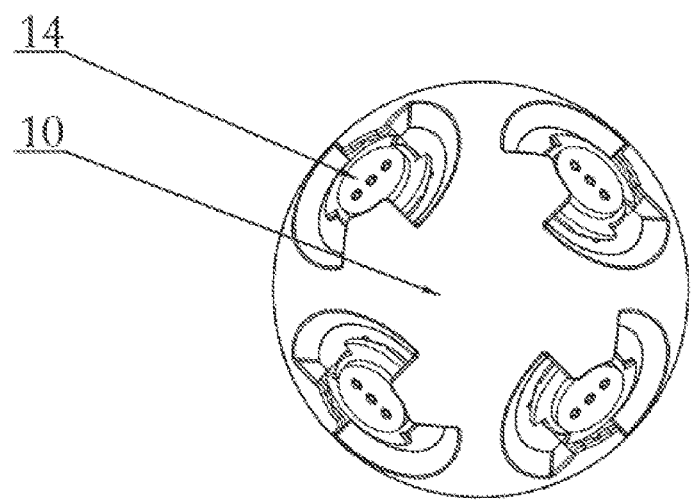
FIG. 2 is a vertical structural diagram of modular robot's subunit modules of the present invention.
Figure 3:
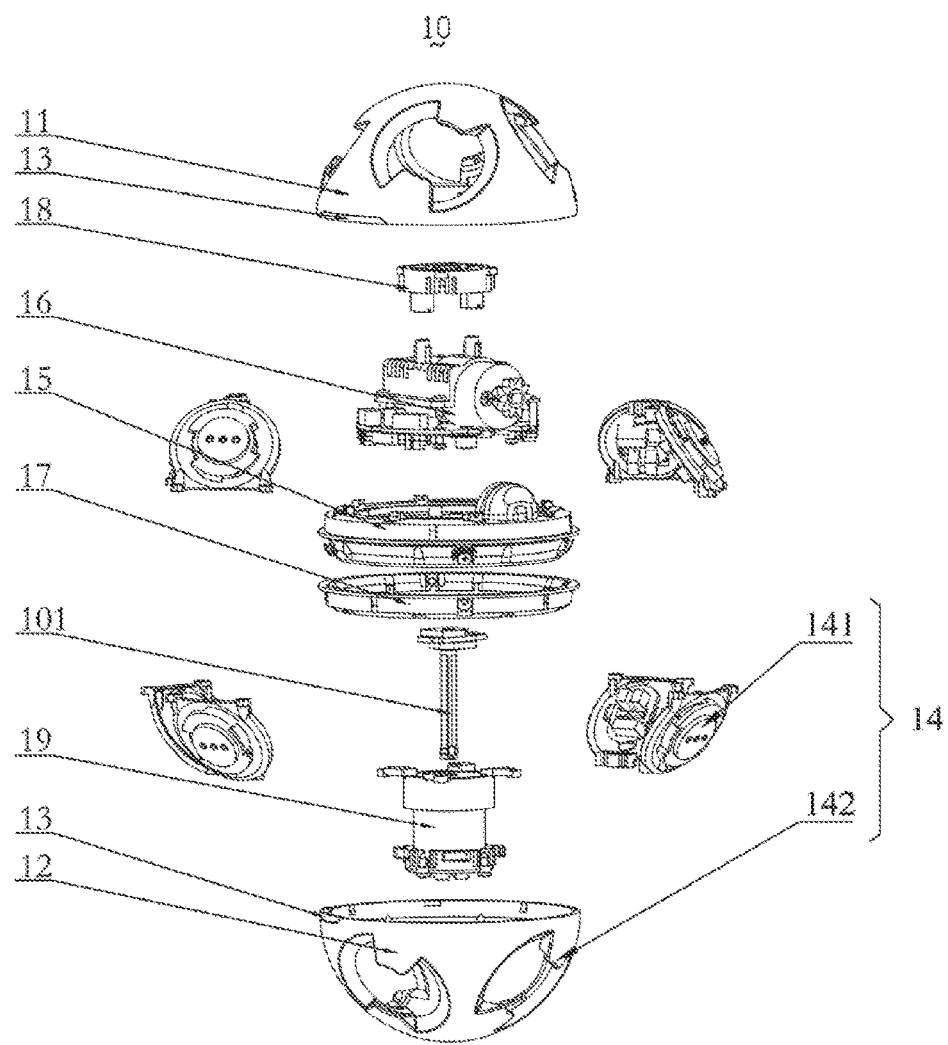
FIG. 3 is an exploded structural diagram of modular robot's subunit modules of the present invention.

Referring to FIG. 2 and FIG. 3, two sub-modules of the subunit module 10 which are disposed oppositely are rotatable relative to each other. Each sub-module is provided with at least one or two docking parts 14. Now it is defined that a plane where a rotation axis of the two sub-modules is located is a rotating plane, and the docking part 14 of each subunit module 10 is inclined with respect to the rotating plane. The two sub-modules may have various shapes. The shapes of the two sub-modules may be the same or different. For example, one is in a truncated cone shape and the other is in a hemispherical shape, as long as the subunit module 10 does not interfere with another subunit module 10 connected there to when the two sub-modules of the subunit module 10 are rotating after different subunit modules 10 are connected to each other through the docking parts 14. The two sub-modules of the subunit module 10 which are disposed oppositely rotate relative to each other, so that other robot modules connected to the subunit module 10 can rotate, thereby changing a spatial position. In order to further explain the structure of the subunit module 10, the shape of the subunit module 10 will be described below as a spherical shape. The spherical shape is only a preferred embodiment, and is not intended to limit the present invention.

The subunit module 10 includes a first housing 11 and a second housing 12 which are disposed oppositely. The first housing 11 and the second housing 12 are rotatably connected to each other. The subunit module 10 further includes a prompting member 13, a multi-stage bearing assembly 15, a drive assembly 16, a connecting ring 17, a mounting bracket 18, a rotating conductive assembly 19 and an angle measuring device 101. The first housing 11 and the second housing 12 are rotatablely connected to cacti other to define an accommodating space. The multi-stage bearing assembly 15, the drive assembly 16, the connecting ring 17, the mounting bracket 18, the rotating conductive assembly 19, and the angle measuring device 101 are all disposed in the accommodating space. There are at least two docking parts 14. Each of the first housing 11 and the second housing 12 is provided with at least one docking part 14. Preferably, at least two docking parts 14 are provided on the first housing 11 and the second housing 12 respectively. The multi-stage bearing assembly 15 is disposed in the accommodating space and is located at a contact surface where the first housing 11 and the second housing 12 are rotatablely connected to each other. The drive assembly 16 is connected to the multi-stage bearing assembly 15. The first housing 1 is connected to the multi-stage bearing assembly 15. The mounting bracket 18 is connected to the multi-stage bearing assembly 15 and is located on a side of the multi-stage bearing assembly 15 away from the second housing 12. The mounting bracket 18 is connected to the first housing 11. The connecting ring 17 is connected to the multi-stage bearing assembly 15. The second housing 12 is connected to the connecting ring 17. The angle measuring device 101 and the rotating conductive assembly 19 are both connected to the multi-stage bearing assembly 15 and are disposed on a side of the multi-stage bearing assembly 15 away from the first housing 11. The angle measuring device 101 and the rotating conductive assembly 19 are both electrically connected to the drive assembly 16. The angle measuring device 101 passes through the rotating conductive assembly 19. The angle measuring device 101 is connected to an end of the rotating conductive assembly 19 away from the first housing 11. The rotating conductive assembly 19 is connected to the second housing 12. The prompting member 13 is disposed on an edge of the first housing 11 that is in contact with the second housing 12: and/or the prompting member 13 is disposed on an edge of the second housing 12 that is in contact with the first housing 11. It can be understood that the prompting member 13 may also be provided on other parts of the first housing and/or the second housing. It can be understood that when there is a plurality of subunit modules 10, the first housings 1 and the second housings 12 of the subunit modules 10 can rotate relative to each other one by one, or the first housings 11 and the second housings 12 of the subunit modules 10 can rotate relative to each other simultaneously. It can be understood that the subunit module 10 may include a power supply. The power supply is disposed in the accommodating space. The power supply is electrically connected to a main circuit board 161.

Figure 4:
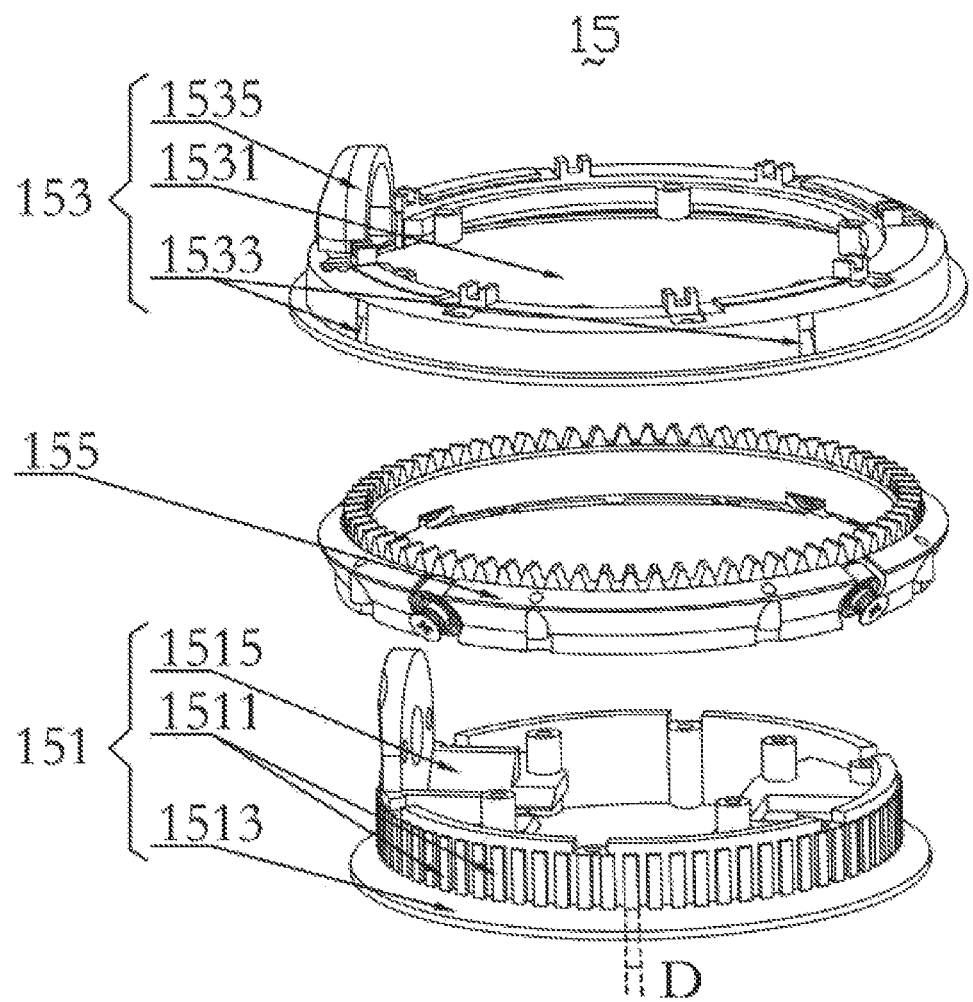
FIG. 4 is an exploded structural diagram of modular robot's multi-stage bearing assembly of the present invention.
Figure 5:
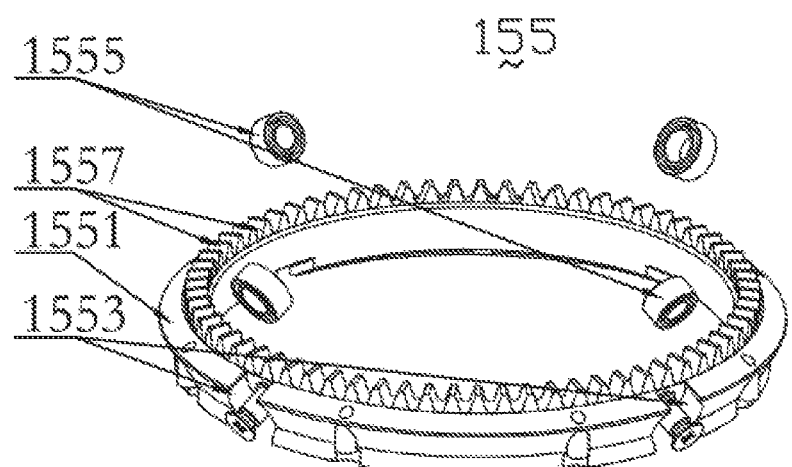
FIG. 5 is an exploded structural diagram of modular robot's middle ring assembly of the present invention.

Referring to FIGS. 4 and 5, the multi-stage bearing assembly 15 includes a multi-stage bearing assembly inner ring 151, a multi-stage bearing assembly outer ring 153 and a middle ring assembly 155. The middle ring assembly 155 sleeves the multi-stage bearing assembly inner ring 151. The middle ring assembly 155 is sandwiched by the multi-stage bearing assembly inner ring 151 and the multi-stage bearing assembly outer ring 153. The middle ring assembly 155 is rotatable relative to the multi-stage bearing assembly outer ring 153 and the multi-stage bearing assembly inner ring 151. Preferably, the multi-stage bearing assembly inner ring 151 is connected to the multi-stage bearing assembly outer ring 153. The middle ring assembly 155 is rotatable relative to the multi-stage bearing assembly outer ring 153 and the multi-stage bearing assembly inner ring 151. The multi-stage bearing assembly inner ring 151 is connected to the drive assembly 16, the rotating conductive assembly 19, and the angle measuring device 101. The multi-stage bearing assembly inner ring 151 is connected to the multi-stage bearing assembly outer ring 153 through the mounting bracket 18 and the docking part 14 successively. The multi-stage bearing assembly outer ring 153 is also connected to the first housing 11. The drive assembly 16 is engaged with the middle ring assembly 155 to drive the middle ring assembly 155 to rotate. The middle ring assembly 155 is connected to the connecting ring 17. The connecting ring 17 is connected to the second housing 12. The connecting ring 17 is connected to an end of the rotating conductive assembly 19 away from the first housing 11 through the docking part 14. It can be understood that the subunit module 10 may also receive an external force, which causes the first housing 11 and the second housing 12 to rotate relative to each other. In this case, the second housing 12 drives the middle ring assembly 155 to rotate relative to the multi-stage bearing assembly inner ring 11 and the multi-stage bearing assembly outer ring 153. The material of the multi-stage bearing assembly 15 is preferably polyformaldehyde ("POM" for short), which has high thermal strength, bending strength, fatigue resistance, wear resistance, and self-lubricating properties.

The multi-stage bearing assembly inner ring 151 is substantially circular. The outer surface of the multi-stage bearing assembly inner ring 151 is provided with ribs 1511. An end of the multi-stage bearing assembly inner ring 151 away from the first housing 11 is provided with a convex edge 1513 away from the center of the multi-stage bearing assembly inner ring 151. An end of the multi-stage bearing assembly inner ring 151 close to the first housing 11 is provided with a motor mounting portion 1515. The width D of the rib 1511 is 1 to 3 mm, preferably 1.5 to 2.5 mm. All the ribs 1511 are evenly distributed on a circumference. A gap between the ribs 1511 is 0.2 to 1.5 mm, preferably 0.3 to 1 mm. The ribs 1511 make a friction force between the middle ring assembly 155 and the multi-stage bearing assembly inner ring 151 smaller. Preferably, the convex edge 1513 is inclined away from the first housing 11 to make the convex edge 1513 and the middle ring assembly 155 better contact. The convex edge 1513 blocks the middle ring assembly 155 from moving in an axial direction of the multi-stage bearing assembly inner ring 151. It can be understood that the multi-stage bearing assembly inner ring 151 may also be provided with a corresponding partition plate or connecting plate, etc., so as to connect other parts of the subunit module 10, such as connection with the multi-stage bearing assembly outer ring 153. Preferably, the material of the multi-stage bearing assembly inner ring 151 is polyformaldehyde, which can prolong the service life of the multi-stage bearing assembly inner ring 151, and make the middle ring assembly 155 and the multi-stage bearing assembly inner ring 151 rotate more smoothly, so that the friction between the middle ring assembly 155 and the multi-stage bearing assembly inner ring 151 is small.

With continued reference to FIG. 5, the middle ring assembly 155 includes a rotating ring 1551 and a plurality of bearings 1555. The bearings 1555 are in rolling contact with the convex edge 1513 of the multi-stage bearing assembly inner ring 151 and the multi-stage bearing assembly outer ring 153. The rotating ring 1551 connects the plurality of bearings 1555 together. The bearings 1555 are rotatable relative to the rotating ring 1551. Meanwhile, the rotating ring 1551 sleeves the multi-stage bearing assembly inner ring 151. It can be understood that an outer ring of each bearing 1555 is in rolling contact with at least one of the convex edge 1513 of the multi-stage bearing assembly inner ring 151 and the multi-stage bearing assembly outer ring 153.

The rotating ring 1551 preferably has a circular ring shape. A plurality of grooves 1553 is formed in a side of the rotating ring 1551. The number of the grooves 1553 corresponds to the number of the bearings 1555. The bearings 1555 are installed in the grooves 1553. The grooves 1553 penetrate two end surfaces of the rotating ring 1551, so that the bearings 1555 can contact the convex edge 1513 of the multi-stage bearing assembly inner ring 151 and the multi-stage bearing assembly outer ring 153. Preferably, the side of the rotating ring 1551 is inclined, and thus the bearings 1555 mounted on the side of the rotating ring 1551 are also inclined, so that the outer ring of each bearing 1555 is better in contact with the convex edge 1513 of the multi-stage bearing assembly inner ring 151, and also the connecting ring 17 is better connected to the rotating ring 1551 of the middle ring assembly 155. An edge of the rotating ring 1551 away from an end surface of the second housing 12 and close to the center of the rotating ring 1551 is provided with a circle of circular rotating teeth 1557. The rotating teeth 1557 are engaged with the drive assembly 16. Preferably, the material of the rotating ring 1551 is polyformaldehyde.

The type of the bearings 1555 is not limited. Preferably, the bearings 1555 are evenly distributed on the side of the rotating ring 1551. The outer ring of each bearing 1555 has a diameter of 3 to 12 mm, preferably 4 to 8 mm.

The multi-stage bearing assembly outer ring 153 has a substantially circular ring shape. The multi-stage bearing assembly outer ring 153 is provided with an annular accommodating groove 1531 in an axial direction to provide a position for the installation of other parts, such as facilitating the connection between the mounting bracket 18 and the multi-stage bearing assembly outer ring 153. The multi-stage bearing assembly outer ring 153 is also provided with a motor protection portion 1535 in the axial direction. When the multi-stage bearing assembly outer ring 153 is connected to the multi-stage bearing assembly inner ring 151, the positions of the motor protection portion 1535 and the motor mounting portion 1515 match with each other. At least two bayonets 1533 are also formed on a side wall of the multi-stage bearing assembly outer ring 153. The bayonets 1533 are used for snap-fit connection with the first housing 11. Preferably, the bayonets 1533 are evenly distributed on the side of the multi-stage bearing assembly outer ring 153. Preferably, the material of the multi-stage bearing assembly outer ring 153 is polyformaldehyde.

Figure 6:
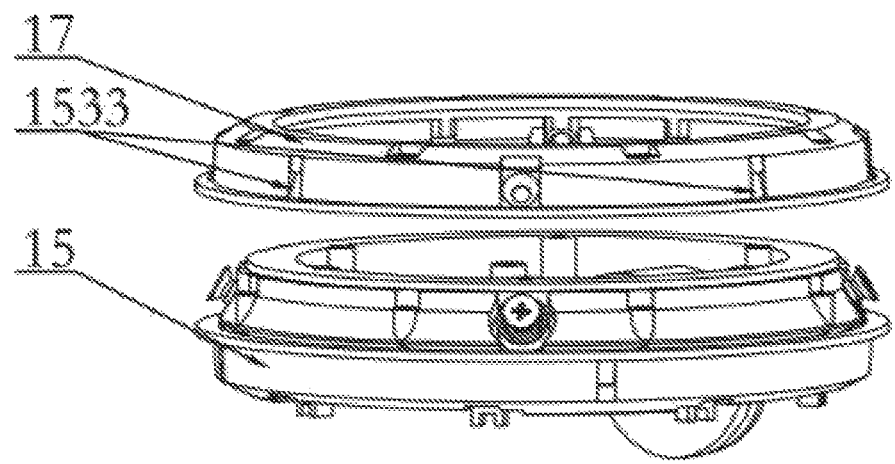
FIG. 6 is an exploded structural diagram of modular robot's multi-stage bearing assembly and connecting ring of the present invention.

Referring to FIG. 6, the connecting ring 17 is disposed on the side of the multi-stage bearing assembly 15 away from the first housing 11. The connecting ring 17 is connected to the middle ring assembly 155. The connecting ring 17 has a substantially circular ring shape. A plurality of bayonets is formed on a side wall of the connecting ring 17. The bayonets on the connecting ring 17 are the same as the bayonets 1533 on the multi-stage bearing assembly outer ring 153. Preferably, the bayonets on the connecting ring 17 are evenly distributed on a side wall of the connecting ring 17. It can be understood that the connecting ring 17 may be omitted. When the connecting ring 17 is omitted, the second housing 12 is directly connected to the rotating ring 1551 of the middle ring assembly 155.

Figure 7:
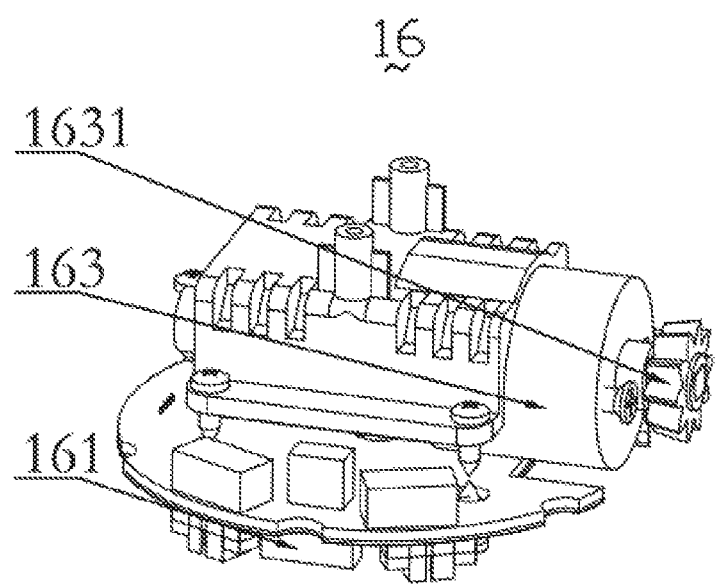
FIG. 7 is a spatial structural diagram of modular robot's drive assembly of the present invention.

Referring to FIG. 7, the drive assembly 16 includes a main circuit board 161, a motor 163 and a bevel gear 1631. The main circuit board 161 and the motor 163 are both connected to the rotating ring 1551. The motor 163 is located on a side of the main circuit board 161 close to the first housing 11. That is, the motor 163 is provided on the motor mounting portion 1515 of the rotating ring 1551. The motor protection portion 1535 of the multi-stage bearing assembly outer ring 153 partially protects a rotating shaft of the motor 163. The motor 163 is also electrically connected to the main circuit board 161. The bevel gear 1631 is connected to the rotating shaft of the motor 163. The bevel gear 1631 is engaged with the rotating teeth 1557 on the rotating ring 1551 of the middle ring assembly 155. When the motor 163 rotates, the bevel gear 1631 is driven to rotate. The bevel gear 1631 drives the rotating ring 1551 to rotate. The bearings 1555 on the rotating ring 1551 are in rolling contact with the convex edge 1513 of the multi-stage bearing assembly inner ring 151. The bearings 1555 on the rotating ring 1551 are in rolling contact with the multi-stage bearing assembly outer ring 153. The rotating ring 1551 drives the connecting ring 17 connected to the rotating ring 1551, the second housing 12 and the like to rotate. It can be understood that when a user makes the first housing 11 and the second housing 12 rotate relative to each other with an external force, the middle ring assembly 155 drives the rotating shaft of the motor 163 to rotate.

Components necessary for the functionality of the subunit module 10 are integrated on the main circuit board 161. For example, the main circuit board 161 includes a signal receiving module configured to receive signals from other subunit modules 10 or the main communication module of the main unit module 30. For example, the main circuit board 161 also includes a control circuit, such as a central processing unit, configured to control the operation of other modules or components. The control circuit of the main circuit board 161 may receive control signals from other robot modules to control the relative rotation of the first housing 11 and the second housing 12 of the subunit module 10. The control circuit receives the control signal through the docking part 14 or the control circuit receives a wireless control signal to control the motor 163 to drive the multi-stage bearing assembly 15 to rotate. It can be understood that when other components are electrically connected to the main circuit board 161, they will be electrically connected to the control circuit.

Figure 8:
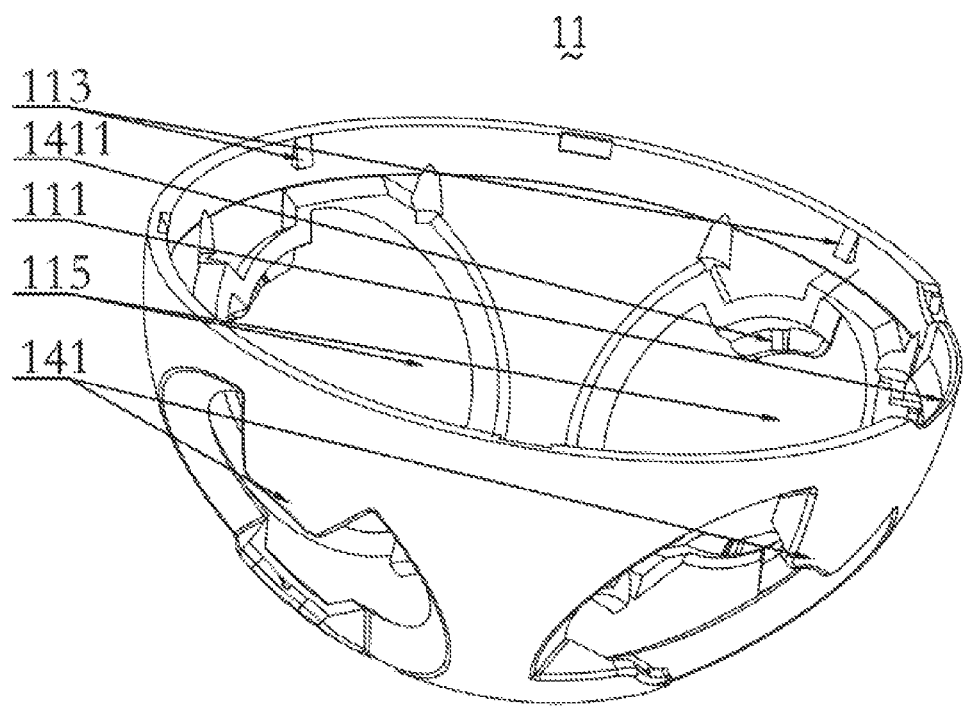
FIG. 8 is an exploded structural diagram of modular robot's first housing of the present invention.
Figure 9:
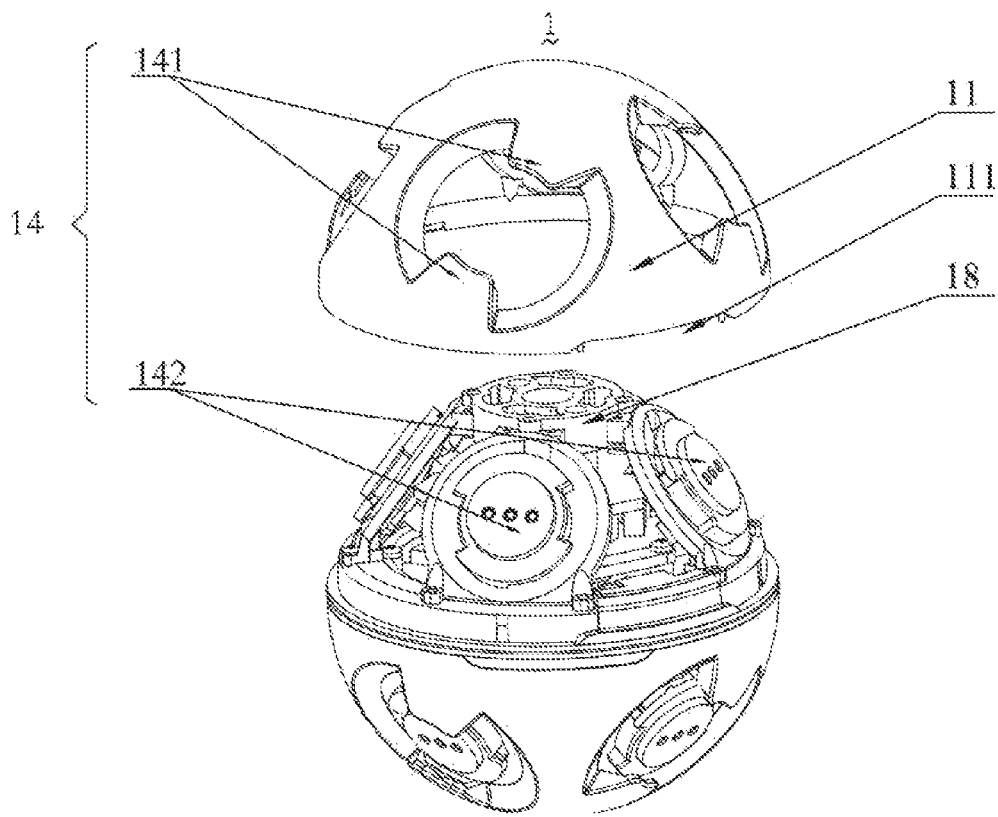
FIG. 9 is an exploded structural diagram of modular robot's subunit modules of the present invention.

Referring to FIG. 8 and FIG. 9, the mounting bracket 18 is disposed on a side of the motor 163 away from the second housing 12. The mounting bracket 18 is connected to the multi-stage bearing assembly inner ring 151. The material of the mounting bracket 18 is preferably plastic.

The first housing 11 has a substantially hemispherical shape, and is provided with a docking hole 115. The wall of the docking hole 115 is inclined. Preferably, the diameter of the docking hole 115 gradually increases from an end close to the center of the subunit module 10 to an end far from the center of the subunit module 10. Preferably, the wall of the docking hole 115 is inclined in an arc shape. Wedge-shaped protrusions 113 are provided at a portion where the first housing 11 is connected to the multi-stage bearing assembly outer ring 153. The number and position of the wedge-shaped protrusions 113 correspond to the number and position of the bayonets 1533 of the multi-stage bearing assembly outer ring 153. When the first housing 11 is connected to the multi-stage bearing assembly outer ring 153, the wedge-shaped protrusions 113 are snap-fitted into the bayonets 1533, so that the first housing 11 and the bayonets 1533 are snap-fitted with each other. After the snap-fitted connection, the wedge-shaped protrusions 113 and the bayonets 1533 are all enclosed inside the subunit module 10, and thus the subunit module 10 can be prevented from being easily disassembled, thereby achieving certain confidentiality and protection for an internal structure of the subunit module 10. It can be understood that the position of the wedge-shaped protrusions 113 and the position of the bayonets 1533 can be exchanged without affecting the snap-fitting function. The contact surface where the first housing 11 is in contact with the second housing 12 is provided with a yield area 111. The yield area 11 is used to install the prompting member 13 so that the prompting member 13 does not interfere with other components. It can be understood that the prompting member 13 may also be provided at other positions on the first housing 11, and is preferably provided close to the docking part 14. The prompting member 13 may also be provided on the docking part 14 of the first housing 11. When the subunit module 10 needs to be connected to other subunit modules 10 or the main unit module 30 or the wheel 2 through the docking part 14, the prompting member close to the docking part 14 or the prompting member 13 on the docking part 14 illuminates. The prompting member 13 is preferably a light strip, and may also be one or more indicator lamps, such as an LED lamp, so that the prompting member 13 may illuminate.

The structure of the second housing 12 is the same as that of the first housing 11. For example, the second housing 12 is also provided with a docking hole 115, wedge-shaped protrusions 113 are disposed at a portion where the first housing 11 is connected to the connecting ring 17, and the contact surface where the second housing 12 is in contact with the first housing 11 is provided with a yield area 111 for installing the prompting member 13, which will not be further elaborated in the present invention. It can be understood that the prompting member 13 may also be disposed at other positions on the second housing 12, and is preferably disposed close to the docking part 14. The prompting member 13 may also be provided on the docking part 14 of the second housing 12. When the subunit module 10 needs to be connected to other subunit modules 10 or the main unit module 30 or the wheel 2 through the docking part 14, the prompting member close to the docking part 14 or the prompting member 13 on the docking part 14 illuminates.

The docking part 14 is used to mechanically and electrically connect two adjacent robot modules. Each docking part 14 includes two docking members 141 and one linked member 142. The structure and connection position of the docking part 14 on the first housing 11 will now be described. The docking members 141 are disposed on the first housing 11. The linked member 142 is indirectly connected to the first housing 11. Specifically, the two docking members 141 are disposed on an edge of one docking hole 115. One linked member 142 is exposed from one docking hole 115. The edge of the linked member 142 is connected to the mounting bracket 18 and the multi-stage bearing assembly outer ring 153, respectively. It can be understood that the prompting member 13 may also be provided on the docking member 141 and/or the linked member 142. Preferably, four docking parts 14 are provided on the first housing 11. That is, eight docking members 141 and four linked members 142 are provided. The four docking parts 14 are evenly distributed on the first housing 11.

The docking member 141 gradually becomes thinner from an end connected to the wall of the docking hole 115 toward an end away from the wall of the docking hole 115. Preferably, a concave point 1411 is provided at a side of the docking member 141 toward the center of the subunit module 10. Specifically, a concave point 1411 is provided at a side of the docking member 141 which gradually becomes thinner from an end away from the wall of the docking hole 115 toward the center of the subunit module 10. The concave point 1411 is used for snap-fitting with the linked member 142.

Figure 10:
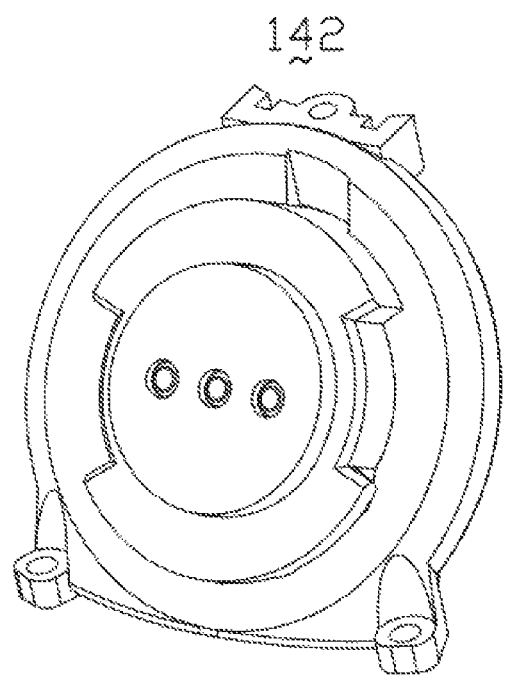
FIG. 10 is a spatial structural diagram of modular robot's linked member of the present invention.
Figure 11:
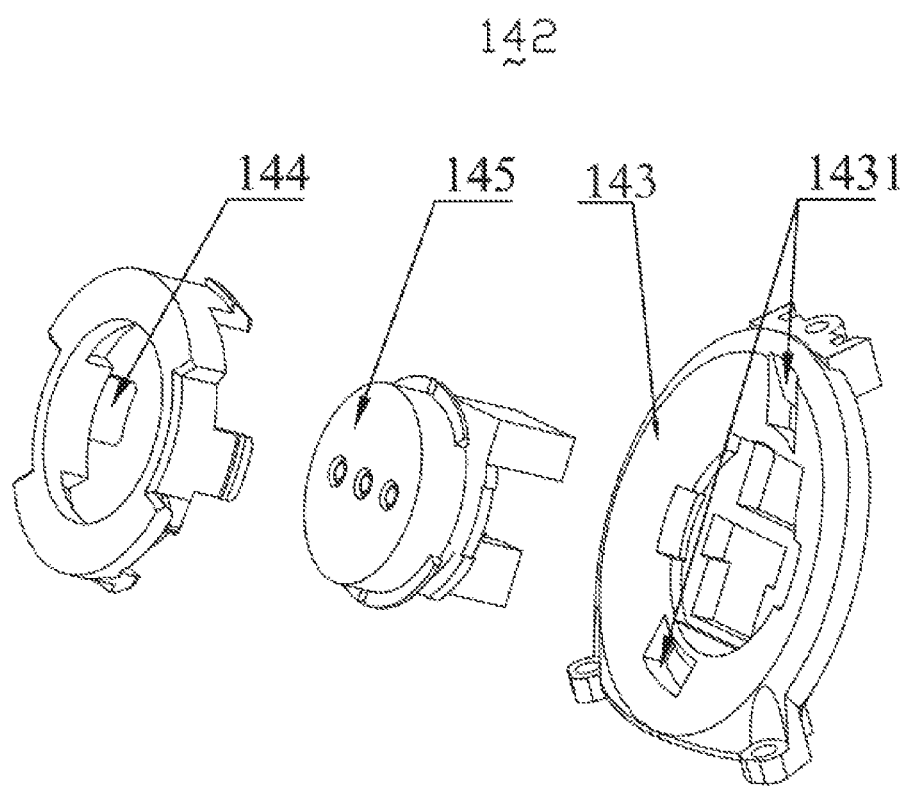
FIG. 11 is an exploded structural diagram of modular robot's linked member of the present invention.

Referring to FIG. 10 and FIG. 11, the linked member 142 includes an inner shell 143, a positioning shell 144 and an elastic conductive assembly 145. The edge of the inner shell 143 is connected to the mounting bracket 18 and the multi-stage bearing assembly outer ring 153 respectively. The positioning shell 144 is connected to the inner shell 143 and the elastic conductive assembly 145 is sandwiched therebetween. The elastic conductive assembly 145 is connected to the inner shell 143. The elastic conductive assembly 145 also partially passes through the positioning shell 144. The elastic conductive assembly 145 is exposed from the docking hole 115. When the subunit module 10 is connected to another subunit module 10, the docking member 141 of one subunit module 10 is snap-fitted with the positioning shell 144 of the linked member 142 of the other subunit module 10 to achieve mechanical connection, and the elastic conductive assembly 145 of one subunit module 10 is in contact with the elastic conductive assembly 145 of the other subunit module 10 to achieve electrical connection.

The inner shell 143 is substantially circular. The end face of the inner shell 143 where the docking hole 115 is exposed is recessed toward the center of the subunit module 10 to facilitate the snap-fitting between the docking parts 14. The inner shell 143 is provided with a clamping groove 1431 to be snap-fitted with the positioning shell 144. There are at least two clamping grooves 1431, preferably three or four, so that the positioning shell 144 and the inner shell 143 are more firmly snap-fitted with each other. Preferably, the positions of the clamping grooves 1431 are asymmetrically arranged, so that when the positioning shell 144 is connected to the inner shell 143, the positioning shell 144 can only be connected to the inner shell 143 from one position, which plays a foolproof role. It can be understood that other structures such as holes or slots may also be provided on the inner shell 143 to install and fix the elastic conductive assembly 145.

Figure 12:
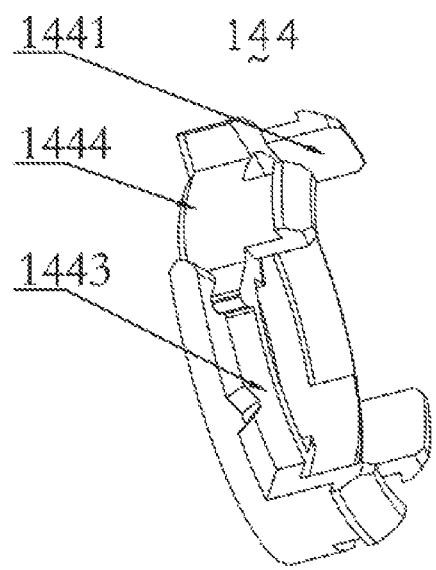
FIG. 12 is a spatial structural diagram of modular robot's positioning shell of the present invention.
Figure 13:
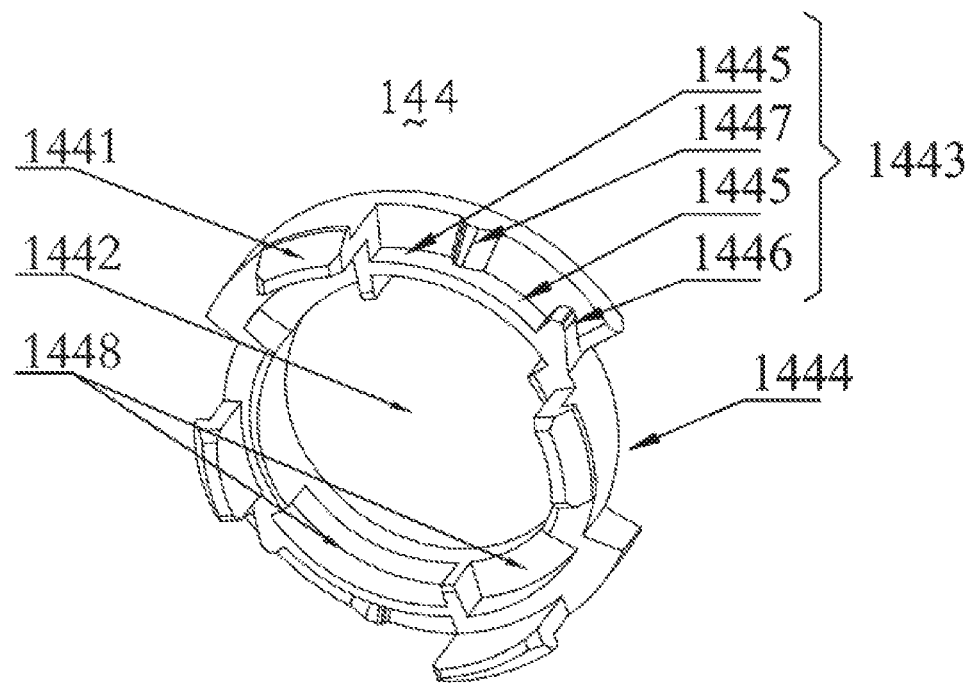
FIG. 13 is a spatial structural diagram of modular robot's positioning shell of the present invention from another perspective.

Referring to FIG. 12 and FIG. 13, an end of the positioning shell 144 toward the inner shell 143 is provided with claws 1441. The position and number of the claws 1441 match the position and number of the clamping grooves 1431. The positioning shell 144 is formed with a through hole 1442 penetrating along its axis. A side wall of the through hole 1442 is provided with a positioning groove 1448. The positioning groove 1448 communicates with an end surface close to the inner shell 143. An arc-shaped limiting portion 1443 and a notch 1444 are disposed at a side of the positioning shell 144. The arc-shaped limiting portion 1443 is in communication with the notch 1444. When the docking member 141 of one subunit module 10 is snap-fitted with the docking member 142 of another subunit module 10, the docking member 141 enters the arc-shaped limiting portion 1443 from the notch 1444, and the position of the docking member 141 is limited by the arc-shaped limiting portion 1443.

The through hole 1442 is used for allowing the elastic conductive assembly 145 to pass through. The positioning groove 1448 is used to cooperate with the elastic conductive assembly 145.

The positioning groove 1448 is used to cooperate with the elastic conductive assembly 145 to prevent the elastic conductive assembly 145 from protruding too much from the through hole 1442. There is preferably a plurality of positioning grooves 1448. The positioning grooves 1448 are preferably arranged asymmetrically, so that the elastic conductive assembly 145 plays a foolproof role when cooperating with the positioning grooves 1448. Preferably, the positioning grooves 1448 may also be arranged symmetrically, but all the positioning grooves 1448 have only one axis of symmetry, so that the elastic conductive assembly 145 can only cooperate with the positioning grooves 1448 from two directions.

The arc-shaped limiting portion 1443 includes a limiting groove 1445 and a blocking member 1446. The blocking member 1446 is disposed between the limiting groove 1445 and the notch 1444. A side wall of the limiting groove 1445 away from the inner shell 143 is provided with a convex point 1447. Preferably, the thickness of the blocking member 1446 gradually increases from the position of the notch 1444 toward the limiting groove 1445, so that when the docking member 141 enters the limiting groove 1445 from the notch 1444, the docking member 141 easily enters the limiting groove 1445. After the end of the docking member 141 completely enters the limiting groove 1445, the blocking member 1446 becomes thick, and the docking member 141 is less likely to move out of the limiting groove 1445. The position of the convex point 1447 matches the position of the concave point 1411 on the docking member 141, so that when the docking member 141 is snap-fitted in the limiting groove 1445, the convex point 1447 is snap-fitted into the concave point 1411. It can be understood that the position of the convex point 1447 and the position of the concave point 1411 can be exchanged. The concave point 1411 instead of the convex point 1447 maybe provided at the position of the convex point 1447, and the convex point 1447 instead of the concave point 1411 may be provided at the position of the concave point 1411.

Figure 14:
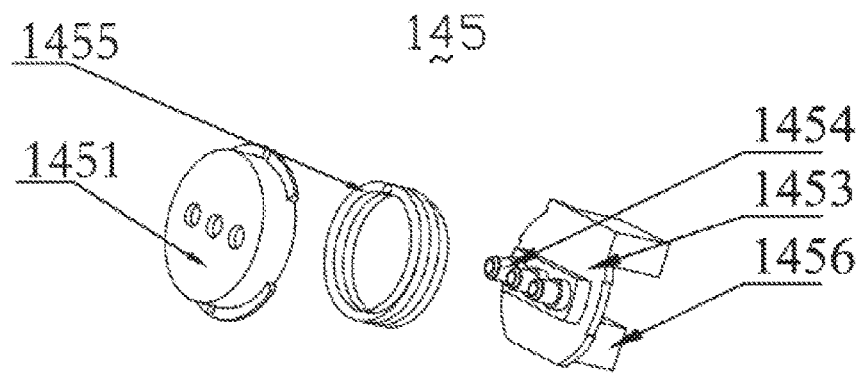
FIG. 14 is an exploded structural diagram of modular robot's elastic conductive assembly of the present invention.

Referring to FIG. 14, the elastic conductive assembly 145 includes a protective shell 1451, a docking circuit board 1453, and an elastic member 1455. The protective shell 1451 is blocked by the positioning groove 1448. The protective shell 1451 passes through the through hole 1442 of the positioning shell 144 and is partially exposed. The elastic member 1455 is disposed between the protective shell 1451 and the inner shell 143. The docking circuit board 1453 is connected to the inner shell 143. The docking circuit board 1453 is also provided with an elastic probe 1454 and a socket 1456. The socket 1456 is electrically connected to the main circuit board 161. When the protective shell 1451 is pressed, the elastic member 1455 shortens, the protective shell 1451 moves toward the inner shell 143, and the elastic probe 1454 passes through the protective shell 1451 and is exposed.

The docking circuit board 1453 is provided on a side of the inner shell 143 toward the protective shell 1451. The socket 1456 is disposed on a side of the circuit board away front the protective shell 1451. The socket 1456 passes through the inner shell 143. The elastic probe 1454 is disposed on a side of the circuit board close to the protective shell 1451. Preferably, there are three elastic probes 1454. Preferably, a fixing member (not labeled) is provided at the bottom of the elastic probe 1454 to fix the three elastic probes 1454 together, and thus the connection between the elastic probe 1454 and the docking circuit board 1453 has a better effect. It can be understood that the socket 1456 can be omitted, and the docking circuit board 1453 is directly electrically connected to the main circuit board 161. It can be understood that the docking circuit board 1453 may not be provided, and the elastic probe 1454 is directly electrically connected to the main circuit board 161.

The elastic member 1455 is preferably a spring. The elastic member 1455 preferably sleeves the fixing member. One end of the elastic member 1455 is in contact with the protective shell 1451, and the other end of the elastic member is in contact with the docking circuit board 1453 or the inner shell 143.

Figure 15:
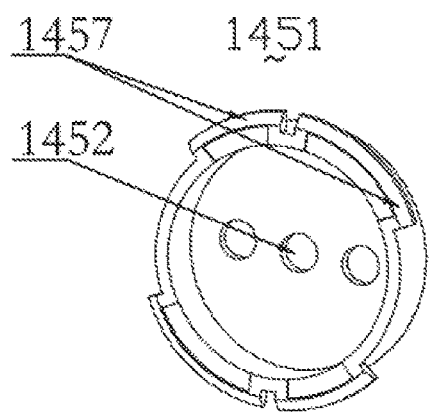
FIG. 15 is a spatial structural diagram of modular robot's protective shell of the present invention.

Referring to FIG. 15, the protective shell 1451 is roughly "bottle cap-shaped". The bottom of the protective shell 1451 is provided with small holes 1452. Limiting edges 1457 away from the center of the protective shell 1451 are provided at a side of the protective shell 1451 close to the top. The position and number of the small holes 1452 correspond to the position and number of the elastic probes 1454. When the protective shell 1451 is pressed, the elastic probes 1454 are exposed from the small holes 1452. In this embodiment, the number of the small holes 1452 is three. The position and number of the limiting edges 1457 correspond to the position and number of the limiting grooves 1445. When the elastic conductive assembly 145 is sandwiched between the inner shell 143 and the positioning shell 144, the limiting edges of the protective shell 1451 slide in the limiting grooves 1445 of the positioning shell 144. When the protective shell 1451 is pressed, the protective shell 1451 moves toward the inner shell 143, and the elastic probes 1454 are exposed from the small holes 1452. The elastic probes 1454 are also compressed, and the length of each elastic probe 1454 becomes shorter.

When connected through the docking parts 14, such as when the main unit module 30 is connected to the subunit module 10, the docking member 141 of the subunit module 10 is inserted into the notch 1444 of the main unit module 30, and the docking member 141 of the main unit module 30 is inserted into the notch 1444 of the subunit module 10. The main unit module 30 and/or the subunit module 10 is forcibly rotated. The docking member 141 slides from the notch 1444 into the limiting groove 1445 of the arc-shaped limiting portion 1443. The docking member 141 is blocked by the blocking member 1446. The concave point 1411 on the docking member 141 is clamped on the convex point 1447 on the side wall of the limiting groove 1445 to realize the mechanical snap-fitting connection of the main unit module 30 and the subunit module 10. In addition, when the main unit module 30 is connected to the subunit module 10, the elastic probes 1454 of the linked members 14 of the main unit module 30 and the subunit module 10 are all compressed, such that the elastic probes 1454 of the main unit module 30 are in contact with the elastic probes 1454 of the subunit module 10 to realize electrical connection and/or signal transmission of the main unit module 30 and the subunit module 10. It can be understood that when the subunit module 10 is connected to other modular robot modules, electrical connection and/or signal transmission is also achieved through this structure. For example, mechanical connection, electrical connection and/or signal transmission between two subunit modules 10 are implemented in the same manner as described above.

Figure 16:
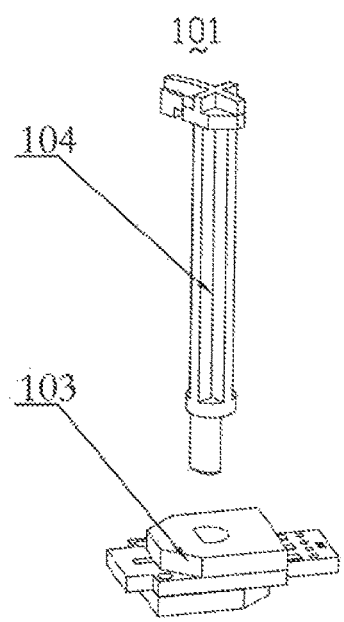
FIG. 16 is an exploded structural diagram of modular robot's angle measuring device of the present invention.

Referring to FIG. 16, the angle measuring device 101 directly senses the rotation of the second housing 12 relative to the first housing 11. Specifically, the angle measuring device 101 includes a rotating shaft 104 and a sensor 103. The sensor 103 is connected to the first housing 11 through the multi-stage bearing assembly inner ring 151. The rotating shaft 104 includes a first end 1041 and a second end 1043 opposite to cacti other. The first end 1041 of the rotating shaft 104 is connected to the sensor 103. The second end 1043 of the rotating shaft 104 is connected to the second housing 12. When the second housing 12 rotates relative to the first housing 11, the rotating shaft 104 is driven to rotate. The rotation of the second housing 12 is sensed by the sensor 103. It can be understood that the angle measuring device 101 may also indirectly sense the rotation of the second housing 12 relative to the first housing 11. Specifically, the angle measuring device 101 is an encoder or a code wheel, which is disposed at the rotating shaft of the motor 163 to sense the rotation of the motor 163, so that a relative rotation angle between the first housing 11 and the second housing 12 can be calculated. It can be understood that the angle measuring device 101 is not limited to the above-mentioned structure, as long as it can sense the rotation angle of the second housing 12 relative to the first housing 11.

Figure 17:
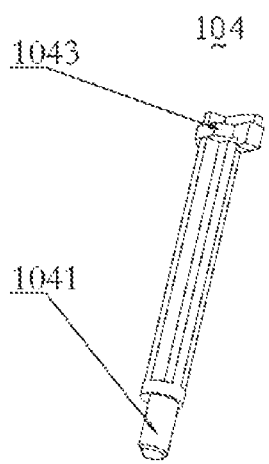
FIG. 17 is a spatial structural diagram of modular robot's rotating shaft of the present invention.

Referring to FIG. 17, across-sectional shape of the first end 1041 of the rotating shaft 104 is preferably substantially "D-shaped". When connected to the sensor 103, the rotating shaft 104 is inserted into the sensor 103 to play a foolproof role. When the rotating shaft 104 is removed, the rotating shaft 104 needs to be installed from the same angle again. The second end 1043 of the rotating shaft 104 is preferably of a pointer shape. When connected to the second housing 12, the rotating shaft 104 also plays a foolproof role. When the rotating shaft 104 is removed, the rotating shaft 104 needs to be installed from the same angle again. Therefore, the second housing 12 and the sensor 103 are always kept at the same angle. After the subunit module 10 is disassembled, there is no need to readjust for reassembling. It can be understood that the shapes of the first end 1041 and the second end 1043 of the rotating shaft 104 are not completely limited to the shapes in the embodiment, and other foolproof structures may be formed as long as a foolproof effect can be realized. The other parts of the subunit module 10 need a foolproof effect, and their shapes are not limited, as long as a foolproof structure can be formed. The foolproof structure is a modification that is easily conceived by those skilled in the art, and will not be further illustrated in the present invention by examples.

Figure 18A:
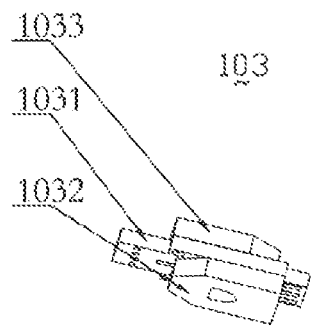
FIG. 18A is a spatial structural diagram of modular robot's sensor of the present invention.

Referring to FIG. 18A, the sensor 103 includes an angle measuring circuit board 1031, a first potentiometer 1032 and a second potentiometer 1033. The first potentiometer 1032 is electrically connected to the second potentiometer 1033 in parallel. Dead zone parts of the two potentiometers do not cover each other. The angle measuring circuit board 1031 is disposed between the first potentiometer 1032 and the second potentiometer 1033. Both the first potentiometer 1032 and the second potentiometer 1033 are connected to the angle measuring circuit board 1031. The first potentiometer 1032 and the second potentiometer 1033 are also both electrically connected to the angle measuring circuit board 1031.

Figure 18B:
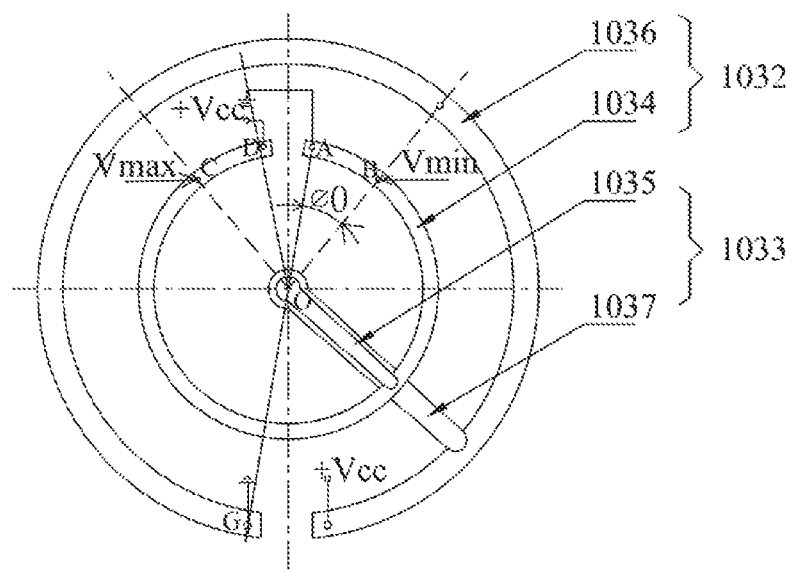
FIG. 18B is a diagram of the measurement principle of modular robot's sensor of the present invention.

Referring to FIG. 18B, the first potentiometer 1032 includes a first resistor 1034 and a first slider 1035. The second potentiometer 1033 includes a second resistor 1036 and a second slider 1037.

An end point of the first slider 1035 slides on the first resistor 1034. An end point of the second slider 1037 slides on the second resistor 1036. The first slider 1035 and the second slider 1037 are fixedly connected to each other with an insulating material. The first slider 1035 and the second slider 1037 share the same rotating shaft. That is, the first slider 1035 and the second slider 1037 are both connected to the first end 1041 of the rotating shaft 104 and rotate about the rotating shaft 104 as the center. A dead zone part of the first resistor 1034 is covered by anon-dead zone part of the second resistor 1036. A dead zone part of the second resistor 1036 is covered by a non-dead zone part of the first resistor 103411.

Input and output ports of the first potentiometer 1032 and the second potentiometer 1033 are integrated in the angle measurement circuit board 1031. The input and output ports include a port of each resistor connected to a voltage Vcc, a ground port, and an output port of cacti slider. It can be understood that the angle measurement circuit board 1031 may not be provided. The first potentiometer 1032 and the second potentiometer 1033 are directly electrically connected to the main circuit board 161. Functional modules of the angle measurement circuit board 1031 are integrated on the main circuit board 161.

In order to take measurements more accurately, the dead zone parts of the potentiometers in the embodiment of the present invention are defined to include two sections: 1. an area that cannot be directly measured by a single potentiometer, that is, an area between two end points of the resistor, such as a minor arc AOD shown in FIG. 18B, 2. two areas, which have low measurement accuracy, of a single potentiometer close to end points, such as a minor arc AOB and a minor arc COD in FIG. 18B, where two critical endpoints B and C of an area with low measurement accuracy correspond to a minimum voltage and a maximum voltage output by the slider. Then, the dead zone part of the first potentiometer 103210 in FIG. 18B is defined as a minor arc BOC area.

The principle of 360-degree angle measurement of the non-dead zone angle measuring device 101 based on dual potentiometer of the present invention is implemented as follows.

The center of the common rotating shaft of the two sliders is marked as O, an end of the first resistor 1034 connected to the voltage Vcc is marked as D, an end of the first resistor 1034 connected to the ground is marked as A, and an end of the second resistor 1036 connected to the ground is marked as G. It is assumed that the minimum voltage and the maximum voltage output by the first potentiometer 1032 are $V_{min}$ and $V_{max}$, respectively, where $V_{min}$ to $V_{max}$ are of an output voltage range where the first potentiometer 1032 measures the rotation angle of the first slider 1035 with a higher measurement accuracy. It is set that when the DC voltage output of the first slider 1035 is $V_{min}$, a point of the first slider 1035 on the first resistor 103411 is B. and meanwhile a point of the second slider 1037 on the second resistor 1036 is F. It is set that when the DC voltage output of the first slider 1035 is $V_{max}$, a point of the first slider 1035 on the first resistor 1034 is C, and meanwhile a point of the second slider 1037 on the second resistor 1036 is E.

If ∠AOB=φ0, the DC voltage output of the first slider 1035 corresponding to point C is $V_{max}$, then:

$$\phi_0 = \frac{V_{min}}{k_1} \quad (2)$$

where k1 is an angular voltage division coefficient of the first resistor 103411.

In addition, a ray OBF is defined as a zero initial line for angle measurement. That is, when the first slider 1035 and the second slider 1037 coincide with the OBF, an angle φ measured at this time is defined as 0. When a voltage value V1 measured by the first slider 1035 satisfies the following formula (3):

$$V_{min} \le V_1 \le V_{max}. \quad (3)$$

That is, when the first slider 1035 slides on a major arc BOC, the measured angle φ is expressed by the following formula (4) using the principle of resistance voltage division of the first resistor 1034:

$$\phi = \frac{V_1}{k_1} - \phi_0. \quad (4)$$

When the voltage value V1 measured by the first slider 1035 does not satisfy the formula (3), that is, when the first slider 1035 does not slide on the major arc BOC, the second slider 1037 exactly slides on a minor arc EOF of the second resistor 1036. The measured DC output voltage of the second slider 1037 is V2. Using the principle of resistance voltage division on the second resistor 1036, the angle φ measured at this time can be obtained by the following formula (5):

$$\phi = \frac{V_2}{k_2} - \angle EOG + \frac{V_{max}}{k_1} - \phi_0, \quad (5)$$

where k2 is an angular voltage division coefficient of the second resistor 103621.

According to a voltage VEOG output by the second slider 1037 at point E, the following formula can be obtained:

$$\angle EOG = \frac{V_{EOG}}{K_2}.$$

According to the minimum voltage and the maximum voltage output by the first potentiometer 1032, the dead zone part of the first potentiometer 1032 is the minor arc BOC area, and the non-dead zone part of the second potentiometer 1033 is set to cover the minor arc BOC area.

Based on the aforementioned non-deadzone angle measuring device 101, the non-dead zone angle measurement method according to the present invention specifically includes:

(1) obtaining ∠AOB and ∠EOG by measurement: and
(2) acquiring an output voltage V1 of the first slider 1035, and determining whether V1 satisfies the formula (3); and if yes, determining the angle φ according to the formula (4); and if not, acquiring an output voltage V2 of the second slider 1037, and then determining the angle q according to the formula (5).

When the angle measurement device 101 is in use, the angle measurement device 101 directly or indirectly senses the rotation of the second housing 12 relative to the first housing 11, the angle measurement device 101 generates a sensing signal and transmits the same to the control circuit of the main circuit board 161. The control circuit controls the relative rotation of the first housing and the second housing according to the sensing signal, including the progress of the rotation, the stop of the rotation, a rotation speed during the rotation, and the like.

During control, the control terminal sends a control signal to the control circuit. The control circuit determines a relative angle that the second housing 12 and the first housing 11 need to rotate according to the control signal. The control circuit controls the relative rotation of the first housing 11 and the second housing 12. The control circuit receives the sensing signal. After the control circuit determines that the relative rotation angle of the first housing 11 and the second housing 12 is in place according to the sensing signal, the control circuit controls the second housing 12 to stop rotating relative to the first housing 11.

As another control method, after the first housing 11 and the second housing 12 are rotated by an external force, the angle measuring device 101 senses a rotation angle. The angle measuring device 101 sends a sensing signal to the control circuit. The control circuit determines the relative rotation angle of the first housing 11 and the second housing 12 according to the sensing signal and transmits the sensing signal to a control terminal. The control terminal generates one or more motion frames according to the sensing signal. The control terminal generates a preset motion and stores the same according to the one or more motion frames. The control terminal can determine a spatial position of each subunit module according to the relative rotation angle of the first housing 11 and the second housing 12 of each subunit module 10. The control terminal sends a preset motion signal to the control circuit according to the preset motion. The control circuit determines a relative angle that the second housing 12 and the first housing 11 need to rotate according to the preset motion signal. The control circuit controls the first housing 11 and the second housing 12 to rotate relative to each other. The control circuit receives the sensing signal. After the control circuit determines that the relative rotation angle of the first housing 11 and the second housing 12 is in place according to the sensing signal, the control circuit controls the second housing 12 to stop rotating relative to the first housing 11.

The subunit modules 10 are connected through the docking parts 14 or the subunit module 10 is connected to other modular robot modules. The subunit module 10 may perform surface recognition with other modular robot modules. That is, it is determined whether the docking part 14 is located on the first housing 11 or on the second housing 12, and also determined which docking part of the subunit module 10 is used to be connected with other modular robot modules. The subunit module 10 sends surface recognition information to the control terminal. When the control terminal determines an angle that the first housing 11 and the second housing 12 of each subunit module 10 need to rotate when determining that the subunit module 10 needs to reach a target position according to the surface recognition information.

Figure 19:
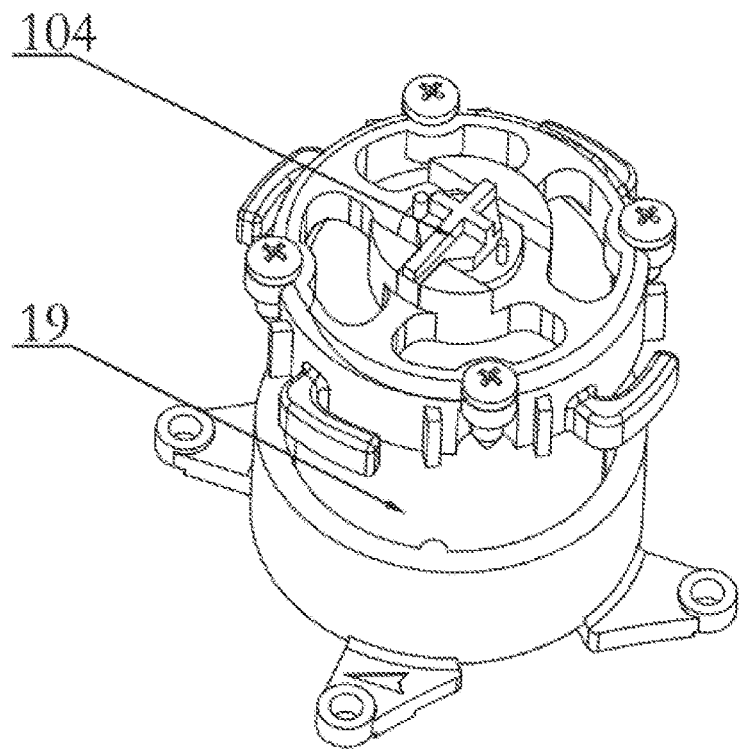
FIG. 19 is a spatial structural diagram of cooperated connection between modular robot's rotating shaft and rotating conductive assembly of the present invention.
Figure 20:
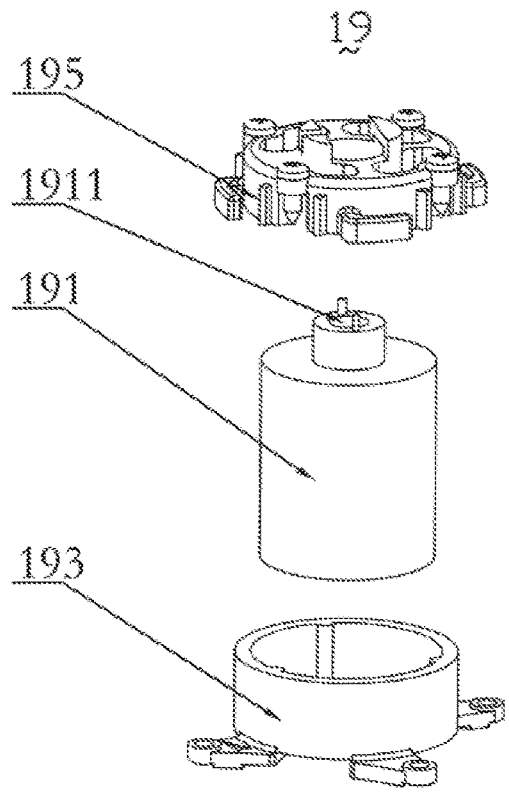
FIG. 20 is an exploded structural diagram of modular robot's rotating conductive assembly of the present invention.

Referring to FIG. 19 and FIG. 20, the rotating conductive assembly 19 includes a fixed end and a rotating end that are disposed oppositely. The rotating end is rotatable relative to the fixed end. The fixed end is connected to the first housing 11 through the multi-stage bearing assembly inner ring 151. The rotating end is connected to the second housing 12. The second end 1043 of the rotating shaft 104 passes through the rotating conductive assembly 19 and is connected to the rotating end. Specifically, the rotating conductive assembly 19 includes a conductive ring 191, a conductive ring seat 193 and a connecting frame 195. The conductive ring seat 193 sleeves the conductive ring 191 and fixes the conductive ring 191 on the first housing 11. An end of the conductive ring away from the first housing 11 is connected to the second housing 12 through the connecting frame 195. The conductive ring 191 is provided with a hollow hole 1911 penetrating through two ends thereof in an axial direction to allow the second end 1043 of the rotating shaft 104 to pass through. The conductive ring seat 193 is located at the fixed end. The connecting frame 195 is located at the rotating end.

The conductive ring seat 193 is substantially cylindrical, and has two through ends without a bottom surface. An end of the conductive ring seat 193 close to the multi-stage bearing assembly inner ring 151 is provided with a fixing foot (not labeled) for fixing the conductive ring seat 193. In order to increase the friction between the conductive ring 191 and the conductive ring seat 193, a rib or the like may be provided in the conductive ring seat 193.

Figure 21:
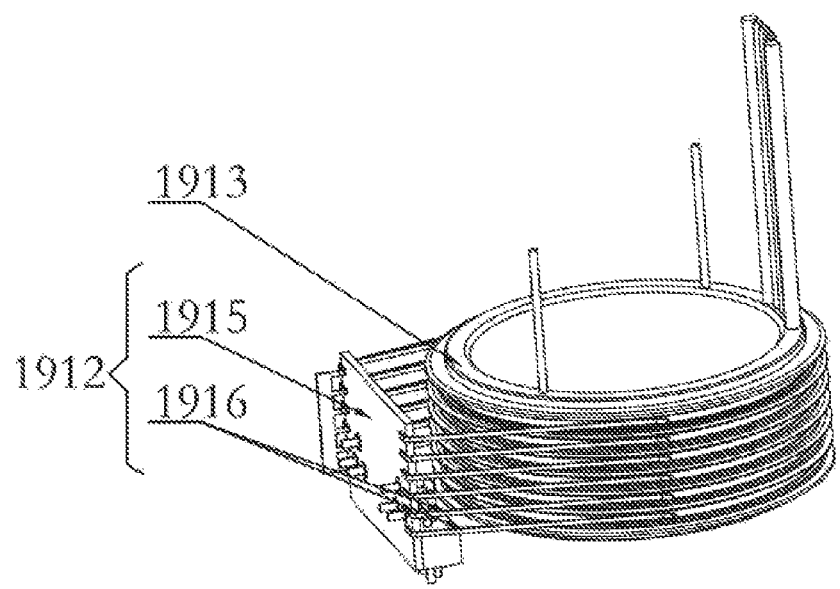
FIG. 21 is an internal structural diagram of modular robot's conductive ring of the present invention.

Referring to FIG. 21, the conductive ring 191 includes a conductive ring housing (not shown), a slip ring body 1913 and a brush wire assembly 1912. The conductive ring housing coaxially sleeves the slip ring body 1913. The brush wire assembly 1912 is disposed between the conductive ring housing and the slip ring body 1913. An end of the slip ring body 1913 away from the first housing 11 is connected to the second housing 12 through the connecting frame 195. An end of the slip ring body 1913 close to the first housing 11 is connected to the first housing 11 through the conductive ring seat 193.

Figure 22:
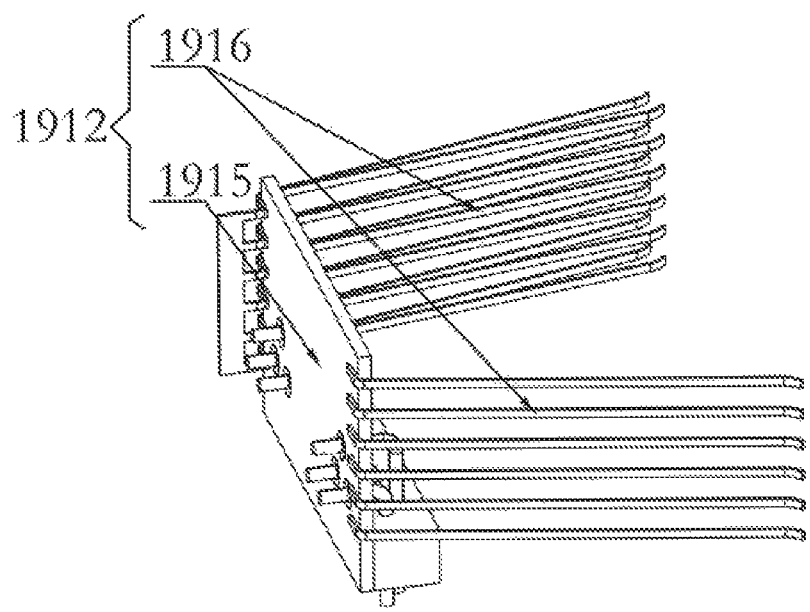
FIG. 22 is a spatial structural diagram of modular robot's brush wire assembly of the present invention.

Referring to FIG. 22, the brush wire assembly 1912 includes a conductive ring circuit board 1915 and a brush wire 1916. One end of the brush wire 1916 is connected to the conductive ring circuit board 1915. The brush wire 1916 is electrically connected to the conductive ring circuit board 1915. The other end of the brush wire 1916 is in contact with the slip ring body 1913. When the slip ring body 1913 rotates, it is continuously in contact with the brush wire 1916 and is electrically connected thereto. When rotating, the brush wire assembly 1912 rotates around the axis of the slip ring body 1913, and only needs to contact the slip ring body 1913 through the brush wire 1916, which has the advantage of simple structure. When the route of the slip ring changes, a way of routing can be changed only by changing the conductive ring circuit board 1915, without changing the entire slip ring, thus saving the cost. It can be understood that the brush wire assembly 1912 may be connected to the conductive ring housing, and the slip ring body 1913 may rotate; or the slip ring body 1913 may be connected to the conductive ring housing, and the brush wire assembly 1912 may rotate. Preferably, the brush wire assembly 1912 is connected to the conductive ring housing, the slip ring body 1913 is rotatable relative to the brush wire assembly 1912 and the conductive ring housing, and the slip ring body 1913 is also connected to a connecting end.

Figure 23:
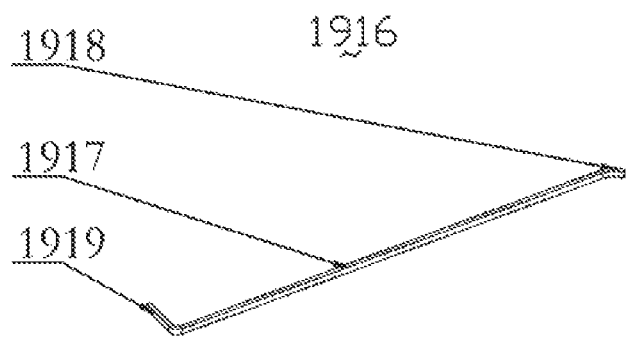
FIG. 23 is a spatial structural diagram of modular robot's brush wire of the present invention.

Referring to FIG. 23, the brush wire 1916 includes a brush wire main body 1917, and a brush wire sliding end 1919 and a brush wire fixed end 1918 at two ends of the brush wire main body 1917. The brush wire sliding end 1919 is an end of the brush wire 1916 which is in contact with the slip ring body 1913. The brush wire fixed end 1918 is an end of the brush wire 1916 which is fixed to the conductive ring circuit board 1915. An obtuse angle is formed between the brush wire main body 1917 and the brush wire sliding end 1919, which can facilitate the rotation of the brush wire sliding end 1919. A right angle is formed between the brush wire main body 1917 and the brush wire fixed end 1918, which can facilitate welding of the brush wire 1916 to the conductive ring circuit board 1915. Preferably, the brush wires 1916 are arranged in parallel.

A plane where the conductive ring circuit board 1915 is located is parallel to the axis of the slip ring body 1913, to ensure that a distance between the conductive ring circuit board 1915 and the slip ring body 1913 is unchanged in any state when the slip ring rotates, so the length of the brush wire 1916 is fixed. The conductive ring circuit board 1915 is also electrically connected to the main circuit board 161.

Figure 24:
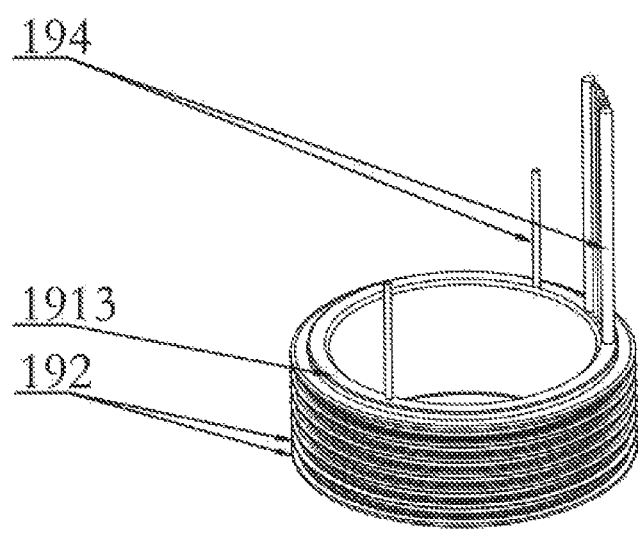
FIG. 24 is a spatial structural diagram of modular robot's slip ring body of the present invention.

Referring to FIG. 24, the slip ring body 1913 has a cylindrical shape. A loop 192 is provided at a side of the slip ring body 1913. An end surface of the slip ring body 1913 away from the multi-stage bearing assembly inner ring 151 is provided with a slip ring binding post 194. The slip ring binding post 194 is electrically connected to the loop 192.

The loop 192 can conduct electricity. The loop 192 is in contact with the brush wire 1916. When the slip ring body 1913 rotates, the brush wire sliding end 1919 rotates relative to the axis of the slip ring body 1913, is in contact with the loop 192 on the slip ring body 1913 through the brush wire 1916, and can rotate at will without the problem of easy winding and breakage due to the use of wires. The function of circuit conduction may also be achieved by the brush wire 1916 contacting the loop 192. Preferably, each loop 192 corresponds to at least two brush wires 1916, to ensure that the brush wires 1916 can contact the slip ring body 1913 at any time, thereby realizing circuit conduction. The number of the loops 192 is not limited, and can be set as needed.

The number of the slip ring binding posts 194 is the same as the number of the loops 192. It can be understood that the slip ring binding post 194 may not be provided, and a conductive wire for conduction is directly used instead.

With continued reference to FIG. 3, the structure of the docking part 14 provided on the second housing 12 is the same as that of the docking part 14 described above, which also includes a docking member 141 and a linked member 142. The specific structure of the docking part 14 provided on the second housing 12 will not be described here. Only the specific connection positions of the docking member 141 and the linked member 142 of the docking part 14 will be illustrated.

The docking member 141 is provided on the edge of the docking hole 115 formed on the second housing 12. The linked member 142 is exposed from the docking hole 115. The edge of the linked member 142 is connected to the connecting frame 195. The edge of the linked member 142 is also connected to the second housing 12 and the rotating ring 1551 of the middle ring assembly 155 respectively through the connecting ring 17. The socket 1456 of the docking circuit board of the linked member 142 is electrically connected to the slip ring binding post 194 of the rotating conductive assembly 19, so as to be electrically connected to the main circuit board 161 via the conductive ring circuit board 1915. When the second housing 12 rotates, the wires required for the electrical connection of the docking member 141 will not be twisted due to the rotation, and will not be broken due to the excessive turn number of rotations. When two subunit modules 10 are connected, the docking member 141 of one subunit module 10 is snap-fitted with the linked member 142 of the other subunit module 10, and the linked members 142 of the two subunit modules 10 realize electrical connection. Preferably, four docking parts 14 are provided on the second housing 12. That is, eight docking members 141 and four linked members 142 are provided. The four docking parts 14 are evenly distributed on the second housing 12.

Figure 25:
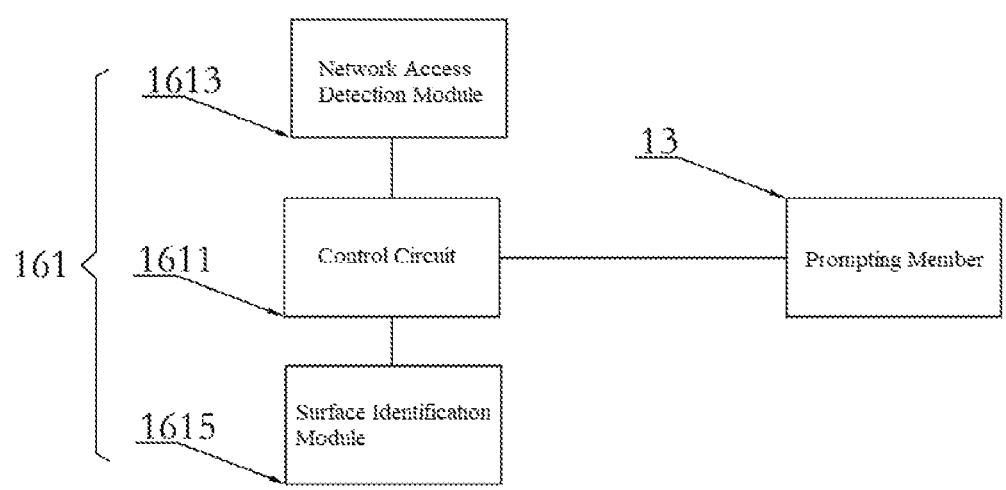
FIG. 25 is a structural diagram of the circuit module of modular robot's prompting member of the present invention.

Referring to FIG. 25, this embodiment continues the description of the prompting member 13 based on the above prompting member 13. The prompting member 13 is electrically connected to the main circuit board 161. The main circuit board 161 controls the prompting member 13 to issue prompts in different situations. For example, when the prompting member 13 is an indicator lamp, the main circuit board 161 controls the illumination of the prompting member 13 under different conditions.

The main circuit board 161 includes a control circuit 1611, a network access detection module 1613, and a surface recognition module 1615. The prompting member 13, the network access detection module 1613, and the surface recognition module 1615 are all electrically connected to the control circuit 1611. The prompting member 13 has a plurality of illumination modes. The control circuit 1611 may control the prompting member 13 to illuminate in the following three modes. In a first mode, when the control circuit 1611 is electrically connected to the outside, for example, when the subunit module 10 is connected to other subunit modules 10, the main unit module 30 or the wheel 2 through the docking parts electrically connected to the main circuit board 161, the subunit module 10 is electrically conducted, or the subunit module 10 receives a data signal transmitted by a robot module, and the control circuit 1611 controls the prompting member 13 to issue a prompt. In a second mode, the control circuit 1611 detects that the subunit module 10 is networked according to the network access detection module 1613, and the control circuit 1611 controls the prompting member 13 to issue a prompt. In a third mode, the control circuit 1611 detects and performs surface recognition with other subunit modules 10, the main unit module 30 or the wheel 2 according to the surface recognition module 1615, and the control circuit 1611 controls the prompting member 13 to issue a prompt. When the prompting member 13 issues a prompt, it can emit different colors of light, or keep constantly illuminating for different times, such as 0.5 to 6 seconds, or flash at different frequencies. It can be understood that there may be a plurality of prompting members 13, and the plurality of prompting members illuminates in cooperation. For example, the plurality of prompting members flashes in cooperation. It can be understood that the prompting members 13 may also have other control modes.

When the modular robot according to the present invention is in use, the wheel 2 and the main unit module 30 may be connected together, or the wheel 2 may be connected to the main unit module 30 through the subunit module 10: or the main unit module 30 and the subunit module 10 may be connected together and connected to other execution structures. The wheel 2, the main unit module 30 and the subunit module 10 may be connected through the docking parts 14.

Compared with the prior art, the subunit module according to the present invention includes the first housing and the second housing which are disposed oppositely. The first housing and the second housing are rotatable relative to each other. Each of the two housings is provided with the docking part. The docking part is used to mechanically and electrically connect other robot modules adjacent to it. The subunit module further includes the control circuit. The control circuit is used for communicating with other robot modules. The subunit module receives control signals from other robot modules to control the relative rotation of the first and second housings of the subunit module; and/or the subunit module receives an external force so that the first and second housings rotate relative to each other. The structure of the subunit module is simple. The two housings are rotatable relative to each other to control the position of other unit modules. The position adjustment structure is simple and feasible.

The subunit module according to the present invention further includes a multi-stage bearing assembly. The first housing and the second housing are both connected to the multi-stage bearing assembly. The first housing and the second housing are rotationally connected to each other through the multi-stage bearing assembly, resulting in a low friction. The first housing and the second housing are rotationally connected together.

The multi-stage bearing assembly according to the present invention includes the multi-stage bearing assembly inner ring, the multi-stage bearing assembly outer ring and the middle ring assembly. The middle ring assembly is rotatable relative to the multi-stage bearing assembly inner ring and the multi-stage bearing assembly outer ring. The middle ring assembly is connected to the drive assembly. The first housing is connected to the multi-stage bearing assembly outer ring. The second housing is connected to the middle ring assembly. The drive assembly drives the middle ring assembly to drive the second housing to rotate. The multi-stage bearing assembly has a simple structure and low friction, which prolongs the service life of the subunit module and reduces the power of the motor.

The subunit module according to the present invention further includes the rotating conductive assembly. The rotating conductive assembly includes the fixed end and the rotating end that are disposed oppositely. The rotating end is rotatable relative to the fixed end. The rotating conductive assembly is disposed on a side of the multi-stage bearing assembly away from the first housing. The fixed end is connected to the first housing through the multi-stage bearing assembly. The rotating end is connected to the second housing. When the first housing and the second housing rotate relative to each other, the wires therein will not be broken during rotation.

The plane where the rotation axis is located when the first housing and the second housing according to the present invention rotate is a rotating surface, and the docking parts are inclined with respect to the rotating surface, so that when the subunit module rotates, the unit module connected thereto will move in two directions.

The above are only preferred embodiments of the present invention and are not intended to limit the present invention. Any modification, equivalent replacement and improvement made within the principles of the present invention shall be included in the protection scope of the present invention.

The invention claimed is:

1. A subunit module for constructing a modular robot, the subunit module capable of being connected with other robot modules and comprising a first housing and a second housing that are disposed oppositely, wherein the first housing and the second housing are rotatable relative to each other, and each of the two housings is provided with a docking part, the docking parts are used to mechanically and electrically connect to the docking parts of other robot modules adjacent to the subunit module; and the subunit module further comprising a control circuit for communicating with other robot modules, wherein the subunit module controls the relative rotation of the first housing and the second housing of the subunit module according to control signals from other robot modules, and/or the first housing and the second housing rotate relative to each other when subjected to an external force; the subunit module further comprising a multi-stage bearing assembly, wherein the first housing and the second housing are both connected to the multi-stage bearing assembly, and the first housing and the second housing are rotatably connected to each other through the multi-stage bearing assembly; the multi-stage bearing assembly comprises a multi-stage bearing assembly inner ring, a multi-stage bearing assembly outer ring, and a middle ring assembly, the middle ring assembly is sandwiched by the multi-stage bearing assembly inner ring and the multi-stage bearing assembly outer ring; the middle ring assembly is rotatable relative to the multi-stage bearing assembly outer ring and the multi-stage bearing assembly inner ring; the middle ring assembly is connected to a drive assembly that includes a motor; the first housing is connected to the multi-stage bearing assembly outer ring: the second housing is connected to the middle ring assembly; and the drive assembly drives the middle ring assembly to drive the second housing to rotate according to control signals from other robot modules.

2. The subunit module for constructing the modular robot according to claim 1, wherein the motor and the docking parts are electrically connected to the control circuit, and the control circuit receives a control signal through the docking parts or the control circuit receives a wireless control signal to control the motor to drive the first housing and the second housing to rotate relative to each other.

3. The subunit module for constructing the modular robot according to claim 2, wherein an end of the multi-stage bearing assembly inner ring away from the first housing is provided with a convex edge away from the center of the multi-stage bearing assembly inner ring; the convex edge blocks the middle ring assembly from moving in an axial direction of the multi-stage bearing assembly inner ring.

4. The subunit module for constructing the modular robot according to claim 3, wherein the middle ring assembly includes a rotating ring and a plurality of bearings; the bearings are in rolling contact with the convex edge of the multi-stage bearing assembly inner ring and the multi-stage bearing assembly outer ring; the rotating ring connects the plurality of bearings together; the bearings are rotatable relative to the rotating ring; meanwhile, the rotating ring sleeves the multi-stage bearing assembly inner ring; an outer ring of each bearing is in rolling contact with at least one of the convex edge of the multi-stage bearing assembly inner ring and the multi-stage bearing assembly outer ring.

5. The subunit module for constructing the modular robot according to claim 4, wherein a plurality of grooves is formed in a side of the rotating ring; the number of the grooves corresponds to the number of the bearings; the bearings are installed in the grooves; the grooves penetrate two end surfaces of the rotating ring, so that the bearings can contact the convex edge of the multi-stage bearing assembly inner ring and the multi-stage bearing assembly outer ring.

6. The subunit module for constructing the modular robot according to claim 4, further comprising a bevel gear, wherein when the motor rotates, the bevel gear is driven to rotate; the bevel gear drives the rotating ring to rotate; the bearings on the rotating ring are in rolling contact with the convex edge of the multi-stage bearing assembly inner ring; the bearings on the rotating ring are in rolling contact with the multi-stage bearing assembly outer ring; the rotating ring drives the second housing connected to the rotating ring to rotate; when the first housing and the second housing rotate relative to each other via an external force, the middle ring assembly drives the rotating shaft of the motor to rotate.

7. The subunit module for constructing the modular robot according to claim 6, wherein an end of the multi-stage bearing assembly inner ring close to the first housing is provided with a motor mounting portion; the multi-stage bearing assembly outer ring is also provided with a motor protection portion in the axial direction; when the multi-stage bearing assembly outer ring is connected to the multi-stage bearing assembly inner ring, the positions of the motor protection portion and the motor mounting portion match with each other.

8. The subunit module for constructing the modular robot according to claim 1, further comprising a mounting bracket, wherein the mounting bracket is disposed on a side of the multi-stage bearing assembly away from the second housing, the mounting bracket is connected to the multi-stage bearing assembly, and the mounting bracket is connected to the first housing through the docking part of the first housing and the multi-stage bearing assembly.

9. The subunit module for constructing the modular robot according to claim 1, further comprising a rotating conductive assembly, wherein the rotating conductive assembly comprises a fixed end and a rotating end which are disposed oppositely; the rotating end is rotatable relative to the fixed end; the rotating conductive assembly is disposed on a side of the multi-stage bearing assembly away from the first housing; the fixed end is connected to the first housing through the multi-stage bearing assembly; and the rotating end is connected to the second housing.

10. The subunit module for constructing the modular robot according to claim 9, wherein the rotating end is connected to the docking part of the second housing, and the docking part of the second housing is connected to the second housing through the multi-stage bearing assembly.

11. The subunit module for constructing the modular robot according to claim 9, further comprising an angle measuring device, wherein the angle measuring device is disposed on the side of the multi-stage bearing assembly away from the first housing, one end of the angle measuring device is connected to the first housing through the multi-stage bearing assembly, and the other end of the angle measuring device passes through the rotating conductive assembly and is connected to the rotating end of the rotating conductive device.

12. The subunit module for constructing the modular robot according to claim 9, further comprising a connecting ring, wherein the middle ring assembly is connected to the connecting ring; the connecting ring is connected to the second housing; the connecting ring is connected to an end of the rotating conductive assembly away from the first housing through the docking part.

13. The subunit module for constructing the modular robot according to claim 1, wherein a plane where a rotation axis is located when the first housing and the second housing rotate is a rotating plane, and the docking parts are inclined with respect to the rotating plane.

14. The subunit module for constructing the modular robot according to claim 1, further comprising a prompting member and a power supply, wherein the prompting member is disposed on the first housing and/or the second housing, and the power supply is connected to the first housing.

15. The subunit module for constructing the modular robot according to claim 1, wherein when the first housing and the second housing rotate relative to each other via an external force; the second housing drives the middle ring assembly to rotate relative to the multi-stage bearing assembly inner ring and the multi-stage bearing assembly outer ring.

* * * * *